(12) United States Patent
Dudovitch et al.

(10) Patent No.: US 12,100,156 B2
(45) Date of Patent: Sep. 24, 2024

(54) GARMENT SEGMENTATION

(71) Applicant: Snap Inc., Santa Monica, CA (US)

(72) Inventors: Gal Dudovitch, Tel Aviv (IL); Peleg Harel, Ramat Gan (IL); Nir Malbin, Shoham (IL); Ma'ayan Shuvi, Tel Aviv (IL); Matan Zohar, Rishon LeZion (IL)

(73) Assignee: Snap Inc., Santa Monica, CA (US)

( * ) Notice: Subject to any disclaimer, the term of this patent is extended or adjusted under 35 U.S.C. 154(b) by 630 days.

(21) Appl. No.: 17/301,690

(22) Filed: Apr. 12, 2021

(65) Prior Publication Data

US 2022/0327709 A1   Oct. 13, 2022

(51) Int. Cl.
| | |
|---|---|
| *G06T 7/11* | (2017.01) |
| *G06F 18/214* | (2023.01) |
| *G06N 3/04* | (2023.01) |
| *G06N 20/00* | (2019.01) |
| *G06T 5/70* | (2024.01) |
| *G06V 40/10* | (2022.01) |

(52) U.S. Cl.
CPC ............ *G06T 7/11* (2017.01); *G06F 18/2155* (2023.01); *G06N 3/04* (2013.01); *G06N 20/00* (2019.01); *G06T 5/70* (2024.01); *G06V 40/103* (2022.01); *G06T 2207/30124* (2013.01); *G06T 2207/30196* (2013.01)

(58) Field of Classification Search
CPC ................. G06T 2210/16; G06T 7/174; G06T 7/10–194; G06T 2207/20112; G06T 2207/30196; G06T 5/70; G06T 2207/20182; G06V 40/103; G06F 18/2155
See application file for complete search history.

(56) References Cited

U.S. PATENT DOCUMENTS

| | | |
|---|---|---|
| 5,604,843 A | 2/1997 | Shaw et al. |
| 5,689,559 A | 11/1997 | Park |
| | (Continued) | |

FOREIGN PATENT DOCUMENTS

| | | |
|---|---|---|
| CN | 201986710 | 9/2011 |
| CN | 109863532 A | 6/2019 |
| | (Continued) | |

OTHER PUBLICATIONS

"U.S. Appl. No. 17/249,239, Non Final Office Action mailed Oct. 5, 2022", 25 pgs.

(Continued)

*Primary Examiner* — Vincent Rudolph
*Assistant Examiner* — Raphael Schwartz
(74) *Attorney, Agent, or Firm* — Schwegman Lundberg & Woessner, P.A.

(57) ABSTRACT

Methods and systems are disclosed for performing operations comprising: receiving a monocular image that includes a depiction of a user wearing a garment; generating a segmentation of the garment worn by the user in the monocular image; accessing a video feed comprising a plurality of monocular images received prior to the monocular image; smoothing, using the video feed, the segmentation of the garment worn by the user to provide a smoothed segmentation of the garment worn by the user; and applying one or more visual effects to the monocular image based on the smoothed segmentation of the garment worn by the user.

20 Claims, 14 Drawing Sheets

(56) References Cited

U.S. PATENT DOCUMENTS

| | | |
|---|---|---|
| 5,880,731 A | 3/1999 | Liles et al. |
| 6,023,270 A | 2/2000 | Brush, II et al. |
| RE36,919 E | 10/2000 | Park |
| RE37,052 E | 2/2001 | Park |
| 6,223,165 B1 | 4/2001 | Lauffer |
| 6,650,793 B1 | 11/2003 | Lund et al. |
| 6,772,195 B1 | 8/2004 | Hatlelid et al. |
| 6,804,417 B1 | 10/2004 | Lund et al. |
| 6,842,779 B1 | 1/2005 | Nishizawa |
| 7,308,332 B2 | 12/2007 | Okada et al. |
| 7,342,587 B2 | 3/2008 | Danzig et al. |
| 7,468,729 B1 | 12/2008 | Levinson |
| 7,636,755 B2 | 12/2009 | Blattner et al. |
| 7,639,251 B2 | 12/2009 | Gu et al. |
| 7,775,885 B2 | 8/2010 | Van Luchene et al. |
| 7,809,192 B2 | 10/2010 | Gokturk et al. |
| 7,859,551 B2 | 12/2010 | Bulman et al. |
| 7,885,931 B2 | 2/2011 | Seo et al. |
| 7,925,703 B2 | 4/2011 | Dinan et al. |
| 8,088,044 B2 | 1/2012 | Tchao et al. |
| 8,095,878 B2 | 1/2012 | Bates et al. |
| 8,099,462 B2 | 1/2012 | Sheng et al. |
| 8,108,774 B2 | 1/2012 | Finn et al. |
| 8,117,281 B2 | 2/2012 | Robinson et al. |
| 8,130,219 B2 | 3/2012 | Fleury et al. |
| 8,146,005 B2 | 3/2012 | Jones et al. |
| 8,151,191 B2 | 4/2012 | Nicol |
| 8,275,590 B2 | 9/2012 | Szymczyk et al. |
| 8,359,247 B2 | 1/2013 | Vock |
| RE43,993 E | 2/2013 | Park |
| 8,379,920 B2 | 2/2013 | Yang et al. |
| 8,384,719 B2 | 2/2013 | Reville et al. |
| RE44,054 E | 3/2013 | Kim |
| RE44,068 E | 3/2013 | Park |
| RE44,106 E | 3/2013 | Park |
| 8,396,708 B2 | 3/2013 | Park et al. |
| RE44,121 E | 4/2013 | Park |
| 8,425,322 B2 | 4/2013 | Gillo et al. |
| 8,458,601 B2 | 6/2013 | Castelli et al. |
| 8,462,198 B2 | 6/2013 | Lin et al. |
| 8,484,158 B2 | 7/2013 | Deluca et al. |
| 8,495,503 B2 | 7/2013 | Brown et al. |
| 8,495,505 B2 | 7/2013 | Smith et al. |
| 8,504,926 B2 | 8/2013 | Wolf |
| 8,559,980 B2 | 10/2013 | Pujol |
| 8,564,621 B2 | 10/2013 | Branson et al. |
| 8,564,710 B2 | 10/2013 | Nonaka et al. |
| 8,581,911 B2 | 11/2013 | Becker et al. |
| 8,582,918 B2 | 11/2013 | Nakada et al. |
| 8,597,121 B2 | 12/2013 | del Valle |
| 8,601,051 B2 | 12/2013 | Wang |
| 8,601,379 B2 | 12/2013 | Marks et al. |
| 8,632,408 B2 | 1/2014 | Gillo et al. |
| 8,648,865 B2 | 2/2014 | Dawson et al. |
| 8,659,548 B2 | 2/2014 | Hildreth |
| 8,683,354 B2 | 3/2014 | Khandelwal et al. |
| 8,692,830 B2 | 4/2014 | Nelson et al. |
| 8,810,513 B2 | 8/2014 | Ptucha et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,890,926 B2 | 11/2014 | Tandon et al. |
| 8,891,880 B2 | 11/2014 | Oami et al. |
| 8,892,999 B2 | 11/2014 | Nims et al. |
| 8,924,250 B2 | 12/2014 | Bates et al. |
| 8,963,926 B2 | 2/2015 | Brown et al. |
| 8,989,786 B2 | 3/2015 | Feghali |
| 9,086,776 B2 | 7/2015 | Ye et al. |
| 9,104,907 B2 | 8/2015 | Whitehill et al. |
| 9,105,014 B2 | 8/2015 | Collet et al. |
| 9,241,184 B2 | 1/2016 | Weerasinghe |
| 9,251,170 B2 | 2/2016 | Moore et al. |
| 9,256,860 B2 | 2/2016 | Herger et al. |
| 9,298,257 B2 | 3/2016 | Hwang et al. |
| 9,314,692 B2 | 4/2016 | Konoplev et al. |
| 9,330,483 B2 | 5/2016 | Du et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,402,057 B2 | 7/2016 | Kaytaz et al. |
| 9,412,192 B2 | 8/2016 | Mandel et al. |
| 9,460,541 B2 | 10/2016 | Li et al. |
| 9,489,760 B2 | 11/2016 | Li et al. |
| 9,503,845 B2 | 11/2016 | Vincent |
| 9,508,197 B2 | 11/2016 | Quinn et al. |
| 9,532,364 B2 | 12/2016 | Fujito |
| 9,544,257 B2 | 1/2017 | Ogundokun et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,648,376 B2 | 5/2017 | Chang et al. |
| 9,697,635 B2 | 7/2017 | Quinn et al. |
| 9,706,040 B2 | 7/2017 | Kadirvel et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,792,714 B2 | 10/2017 | Li et al. |
| 9,839,844 B2 | 12/2017 | Dunstan et al. |
| 9,883,838 B2 | 2/2018 | Kaleal, III et al. |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,965,801 B1 | 5/2018 | Wishne et al. |
| 9,980,100 B1 | 5/2018 | Charlton et al. |
| 9,990,373 B2 | 6/2018 | Fortkort |
| 10,039,988 B2 | 8/2018 | Lobb et al. |
| 10,097,492 B2 | 10/2018 | Tsuda et al. |
| 10,109,315 B2 | 10/2018 | Saban et al. |
| 10,116,598 B2 | 10/2018 | Tucker et al. |
| 10,155,168 B2 | 12/2018 | Blackstock et al. |
| 10,158,589 B2 | 12/2018 | Collet et al. |
| 10,176,636 B1 | 1/2019 | Neustein et al. |
| 10,217,286 B1 | 2/2019 | Angel et al. |
| 10,242,477 B1 | 3/2019 | Charlton et al. |
| 10,242,503 B2 | 3/2019 | McPhee et al. |
| 10,262,250 B1 | 4/2019 | Spiegel et al. |
| 10,282,057 B1 | 5/2019 | Binder et al. |
| 10,348,662 B2 | 7/2019 | Baldwin et al. |
| 10,362,219 B2 | 7/2019 | Wilson et al. |
| 10,402,689 B1 * | 9/2019 | Bogdanovych ......... G06N 3/04 |
| 10,432,559 B2 | 10/2019 | Baldwin et al. |
| 10,454,857 B1 | 10/2019 | Blackstock et al. |
| 10,475,225 B2 | 11/2019 | Park et al. |
| 10,504,266 B2 | 12/2019 | Blattner et al. |
| 10,529,137 B1 | 1/2020 | Black et al. |
| 10,573,048 B2 | 2/2020 | Ni et al. |
| 10,607,411 B1 | 3/2020 | Pezzino et al. |
| 10,656,797 B1 | 5/2020 | Alvi et al. |
| 10,657,695 B2 | 5/2020 | Chand et al. |
| 10,657,701 B2 | 5/2020 | Osman et al. |
| 10,762,174 B2 | 9/2020 | Denton et al. |
| 10,805,248 B2 | 10/2020 | Luo et al. |
| 10,872,451 B2 | 12/2020 | Sheth et al. |
| 10,880,246 B2 | 12/2020 | Baldwin et al. |
| 10,895,964 B1 | 1/2021 | Grantham et al. |
| 10,896,534 B1 | 1/2021 | Smith et al. |
| 10,933,311 B2 | 3/2021 | Brody et al. |
| 10,938,758 B2 | 3/2021 | Allen et al. |
| 10,964,082 B2 | 3/2021 | Amitay et al. |
| 10,979,752 B1 | 4/2021 | Brody et al. |
| 10,984,575 B2 | 4/2021 | Assouline et al. |
| 10,992,619 B2 | 4/2021 | Antmen et al. |
| 11,010,022 B2 | 5/2021 | Alvi et al. |
| 11,030,789 B2 | 6/2021 | Chand et al. |
| 11,030,807 B2 | 6/2021 | Watts et al. |
| 11,036,781 B1 | 6/2021 | Baril et al. |
| 11,063,891 B2 | 7/2021 | Voss |
| 11,069,103 B1 | 7/2021 | Blackstock et al. |
| 11,080,917 B2 | 8/2021 | Monroy-hernández et al. |
| 11,128,586 B2 | 9/2021 | Al Majid et al. |
| 11,188,190 B2 | 11/2021 | Blackstock et al. |
| 11,189,070 B2 | 11/2021 | Jahangiri et al. |

(56) References Cited

U.S. PATENT DOCUMENTS

| | | |
|---|---|---|
| 11,199,957 B1 | 12/2021 | Alvi et al. |
| 11,202,017 B2 | 12/2021 | Holzer et al. |
| 11,218,433 B2 | 1/2022 | Baldwin et al. |
| 11,229,849 B2 | 1/2022 | Blackstock et al. |
| 11,245,658 B2 | 2/2022 | Grantham et al. |
| 11,249,614 B2 | 2/2022 | Brody |
| 11,263,254 B2 | 3/2022 | Baril et al. |
| 11,263,821 B1 | 3/2022 | Singh et al. |
| 11,270,491 B2 | 3/2022 | Monroy-Hernández et al. |
| 11,284,144 B2 | 3/2022 | Kotsopoulos et al. |
| 11,393,133 B2 | 7/2022 | El Kaliouby et al. |
| 11,636,662 B2 | 4/2023 | Berger et al. |
| 11,651,572 B2 | 5/2023 | Berger et al. |
| 11,670,059 B2 | 6/2023 | Berger et al. |
| 11,673,054 B2 | 6/2023 | Berger et al. |
| 11,734,866 B2 | 8/2023 | Berger et al. |
| 11,790,531 B2 | 10/2023 | Dudovitch et al. |
| 2002/0067362 A1 | 6/2002 | Agostino Nocera et al. |
| 2002/0169644 A1 | 11/2002 | Greene |
| 2005/0162419 A1 | 7/2005 | Kim et al. |
| 2005/0206610 A1 | 9/2005 | Cordelli |
| 2006/0294465 A1 | 12/2006 | Ronen et al. |
| 2007/0113181 A1 | 5/2007 | Blattner et al. |
| 2007/0168863 A1 | 7/2007 | Blattner et al. |
| 2007/0176921 A1 | 8/2007 | Iwasaki et al. |
| 2008/0158222 A1 | 7/2008 | Li et al. |
| 2009/0016617 A1 | 1/2009 | Bregman-Amitai et al. |
| 2009/0055484 A1 | 2/2009 | Vuong et al. |
| 2009/0070688 A1 | 3/2009 | Gyorfi et al. |
| 2009/0099925 A1 | 4/2009 | Mehta et al. |
| 2009/0106672 A1 | 4/2009 | Burstrom |
| 2009/0158170 A1 | 6/2009 | Narayanan et al. |
| 2009/0177976 A1 | 7/2009 | Bokor et al. |
| 2009/0202114 A1 | 8/2009 | Morin et al. |
| 2009/0231356 A1 | 9/2009 | Barnes et al. |
| 2009/0265604 A1 | 10/2009 | Howard et al. |
| 2009/0300525 A1 | 12/2009 | Jolliff et al. |
| 2009/0303984 A1 | 12/2009 | Clark et al. |
| 2010/0011422 A1 | 1/2010 | Mason et al. |
| 2010/0023885 A1 | 1/2010 | Reville et al. |
| 2010/0115426 A1 | 5/2010 | Liu et al. |
| 2010/0162149 A1 | 6/2010 | Sheleheda et al. |
| 2010/0203968 A1 | 8/2010 | Gill et al. |
| 2010/0227682 A1 | 9/2010 | Reville et al. |
| 2011/0007174 A1 | 1/2011 | Bacivarov et al. |
| 2011/0093780 A1 | 4/2011 | Dunn |
| 2011/0115798 A1 | 5/2011 | Nayar et al. |
| 2011/0148864 A1 | 6/2011 | Lee et al. |
| 2011/0239136 A1 | 9/2011 | Goldman et al. |
| 2011/0294564 A1 | 12/2011 | Michelstein et al. |
| 2011/0298897 A1 | 12/2011 | Sareen et al. |
| 2012/0113106 A1 | 5/2012 | Choi et al. |
| 2012/0124458 A1 | 5/2012 | Cruzada |
| 2012/0130717 A1 | 5/2012 | Xu et al. |
| 2013/0103760 A1 | 4/2013 | Golding et al. |
| 2013/0147933 A1 | 6/2013 | Kulas |
| 2013/0185679 A1 | 7/2013 | Fretwell et al. |
| 2013/0201187 A1 | 8/2013 | Tong et al. |
| 2013/0249948 A1 | 9/2013 | Reitan |
| 2013/0257877 A1 | 10/2013 | Davis |
| 2013/0293530 A1 | 11/2013 | Perez et al. |
| 2014/0010449 A1 | 1/2014 | Haaramo et al. |
| 2014/0043329 A1 | 2/2014 | Wang et al. |
| 2014/0055554 A1 | 2/2014 | Du et al. |
| 2014/0125678 A1 | 5/2014 | Wang et al. |
| 2014/0129343 A1 | 5/2014 | Finster et al. |
| 2014/0176565 A1 | 6/2014 | Adeyoola et al. |
| 2014/0226000 A1 | 8/2014 | Vilcovsky et al. |
| 2014/0244447 A1 | 8/2014 | Kim et al. |
| 2015/0206349 A1 | 7/2015 | Rosenthal et al. |
| 2015/0370320 A1 | 12/2015 | Connor |
| 2016/0055370 A1 | 2/2016 | Garcia |
| 2016/0127710 A1 | 5/2016 | Saban et al. |
| 2016/0134840 A1 | 5/2016 | Mcculloch |
| 2016/0234149 A1 | 8/2016 | Tsuda et al. |
| 2016/0343164 A1 | 11/2016 | Urbach et al. |
| 2017/0080346 A1 | 3/2017 | Abbas |
| 2017/0087473 A1 | 3/2017 | Siegel et al. |
| 2017/0091535 A1 | 3/2017 | Yu et al. |
| 2017/0091570 A1* | 3/2017 | Rao ............... G06V 40/172 |
| 2017/0113140 A1 | 4/2017 | Blackstock et al. |
| 2017/0118145 A1 | 4/2017 | Aittoniemi et al. |
| 2017/0199855 A1 | 7/2017 | Fishbeck |
| 2017/0235848 A1 | 8/2017 | Van Dusen et al. |
| 2017/0256084 A1 | 9/2017 | Iglehart et al. |
| 2017/0272651 A1 | 9/2017 | Mathy et al. |
| 2017/0310934 A1 | 10/2017 | Du et al. |
| 2017/0312634 A1 | 11/2017 | Ledoux et al. |
| 2017/0337693 A1 | 11/2017 | Baruch |
| 2018/0032818 A1 | 2/2018 | Abraham et al. |
| 2018/0047200 A1 | 2/2018 | O'hara et al. |
| 2018/0089883 A1 | 3/2018 | De Goes et al. |
| 2018/0113587 A1 | 4/2018 | Allen et al. |
| 2018/0115503 A1 | 4/2018 | Baldwin et al. |
| 2018/0129870 A1 | 5/2018 | Bacivarov et al. |
| 2018/0182171 A1 | 6/2018 | Lipner |
| 2018/0198743 A1 | 7/2018 | Blackstock et al. |
| 2018/0240280 A1 | 8/2018 | Chen et al. |
| 2018/0315076 A1 | 11/2018 | Andreou |
| 2018/0315133 A1 | 11/2018 | Brody et al. |
| 2018/0315134 A1 | 11/2018 | Amitay et al. |
| 2019/0001223 A1 | 1/2019 | Blackstock et al. |
| 2019/0050427 A1 | 2/2019 | Wiesel et al. |
| 2019/0057616 A1 | 2/2019 | Cohen et al. |
| 2019/0080457 A1 | 3/2019 | Shukla et al. |
| 2019/0097958 A1 | 3/2019 | Collet et al. |
| 2019/0116322 A1* | 4/2019 | Holzer ............... G06T 7/75 |
| 2019/0121522 A1 | 4/2019 | Davis et al. |
| 2019/0138796 A1 | 5/2019 | Nakata et al. |
| 2019/0188920 A1 | 6/2019 | Mcphee et al. |
| 2019/0196698 A1* | 6/2019 | Cohen ............... G10L 15/22 |
| 2019/0205627 A1 | 7/2019 | De La Torre et al. |
| 2019/0280997 A1 | 9/2019 | Baldwin et al. |
| 2019/0325279 A1 | 10/2019 | Wang et al. |
| 2019/0325631 A1 | 10/2019 | Cao et al. |
| 2019/0347803 A1 | 11/2019 | Lim et al. |
| 2019/0371028 A1 | 12/2019 | Harrises et al. |
| 2020/0019364 A1 | 1/2020 | Pond |
| 2020/0021752 A1 | 1/2020 | Holzer et al. |
| 2020/0066044 A1 | 2/2020 | Stahl et al. |
| 2020/0066052 A1 | 2/2020 | Antonsen et al. |
| 2020/0117938 A1 | 4/2020 | Greenberger et al. |
| 2020/0151807 A1* | 5/2020 | Zhou ............... G06N 3/045 |
| 2020/0219295 A1 | 7/2020 | El Kaliouby et al. |
| 2020/0228729 A1 | 7/2020 | Okuno et al. |
| 2020/0302175 A1 | 9/2020 | Mason |
| 2020/0306637 A1 | 10/2020 | Baldwin et al. |
| 2020/0372127 A1 | 11/2020 | Denton et al. |
| 2020/0410575 A1 | 12/2020 | Grantham et al. |
| 2021/0027100 A1 | 1/2021 | Bogdanovych et al. |
| 2021/0074047 A1 | 3/2021 | Sheth et al. |
| 2021/0089179 A1 | 3/2021 | Grantham et al. |
| 2021/0104087 A1 | 4/2021 | Smith et al. |
| 2021/0168108 A1 | 6/2021 | Antmen et al. |
| 2021/0170270 A1 | 6/2021 | Brody et al. |
| 2021/0192823 A1 | 6/2021 | Amitay et al. |
| 2021/0209825 A1 | 7/2021 | Assouline et al. |
| 2021/0225058 A1 | 7/2021 | Chand et al. |
| 2021/0240315 A1 | 8/2021 | Alvi et al. |
| 2021/0243482 A1 | 8/2021 | Baril et al. |
| 2021/0243503 A1 | 8/2021 | Kotsopoulos et al. |
| 2021/0266277 A1 | 8/2021 | Allen et al. |
| 2021/0281897 A1 | 9/2021 | Brody et al. |
| 2021/0285774 A1 | 9/2021 | Collins et al. |
| 2021/0306290 A1 | 9/2021 | Voss |
| 2021/0306451 A1 | 9/2021 | Heikkinen et al. |
| 2021/0375320 A1 | 12/2021 | Wong et al. |
| 2021/0385180 A1 | 12/2021 | Al Majid et al. |
| 2021/0398095 A1 | 12/2021 | Mallett et al. |
| 2021/0405831 A1 | 12/2021 | Mourkogiannis et al. |
| 2021/0409535 A1 | 12/2021 | Mourkogiannis et al. |
| 2022/0012929 A1 | 1/2022 | Blackstock et al. |
| 2022/0083768 A1* | 3/2022 | Johnson ............... G06T 7/70 |
| 2022/0108470 A1 | 4/2022 | Brown et al. |

(56) References Cited

U.S. PATENT DOCUMENTS

| | | |
|---|---|---|
| 2022/0237799 A1 | 7/2022 | Price et al. |
| 2022/0270261 A1 | 8/2022 | Dudovitch et al. |
| 2022/0270265 A1 | 8/2022 | Dudovitch et al. |
| 2023/0065031 A1 | 3/2023 | Berger et al. |
| 2023/0066179 A1 | 3/2023 | Berger et al. |
| 2023/0070631 A1 | 3/2023 | Berger et al. |
| 2023/0075256 A1 | 3/2023 | Berger et al. |
| 2023/0078483 A1 | 3/2023 | Berger et al. |
| 2023/0085099 A1 | 3/2023 | Ouyang et al. |
| 2023/0100509 A1 | 3/2023 | Berger et al. |
| 2023/0103125 A1 | 3/2023 | Berger et al. |
| 2023/0116652 A1 | 4/2023 | Berger et al. |
| 2023/0154129 A1 | 5/2023 | Berger et al. |
| 2023/0169739 A1 | 6/2023 | Berger et al. |
| 2023/0281936 A1 | 9/2023 | Berger et al. |
| 2023/0343007 A1 | 10/2023 | Berger et al. |
| 2023/0419497 A1 | 12/2023 | Dudovitch et al. |

FOREIGN PATENT DOCUMENTS

| | | |
|---|---|---|
| CN | 110168478 A | 8/2019 |
| CN | 110310319 | 10/2019 |
| CN | 110096156 B | 6/2021 |
| CN | 116917938 | 10/2023 |
| CN | 117136381 A | 11/2023 |
| CN | 117157667 A | 12/2023 |
| CN | 117897734 | 4/2024 |
| CN | 117940962 | 4/2024 |
| EP | 2184092 A2 | 5/2010 |
| EP | 3155560 | 5/2020 |
| EP | 3772040 A1 | 2/2021 |
| JP | 2001230801 A | 8/2001 |
| JP | 5497931 B2 | 3/2014 |
| JP | 5722603 | 4/2015 |
| KR | 101445263 B1 | 9/2014 |
| KR | 20190097815 A | 8/2019 |
| WO | WO-2003094072 A1 | 11/2003 |
| WO | WO-2004095308 A1 | 11/2004 |
| WO | WO-2006107182 A1 | 10/2006 |
| WO | WO-2007134402 A1 | 11/2007 |
| WO | WO-2012139276 A1 | 10/2012 |
| WO | WO-2013027893 A1 | 2/2013 |
| WO | WO-2013152454 A1 | 10/2013 |
| WO | WO-2013166588 A1 | 11/2013 |
| WO | WO-2014031899 A1 | 2/2014 |
| WO | WO-2014194439 A1 | 12/2014 |
| WO | WO-2016054164 A1 | 4/2016 |
| WO | WO-2016090605 A1 | 6/2016 |
| WO | WO-2017008427 A1 | 1/2017 |
| WO | WO-2017203262 A2 | 11/2017 |
| WO | WO-2018075053 A1 | 4/2018 |
| WO | WO-2018081013 A1 | 5/2018 |
| WO | WO-2018102562 A1 | 6/2018 |
| WO | WO-2018129531 A1 | 7/2018 |
| WO | WO-2019089613 A1 | 5/2019 |
| WO | WO-2019162842 A1 | 8/2019 |
| WO | WO-2020163592 A1 | 8/2020 |
| WO | WO-2021174139 A1 | 9/2021 |
| WO | WO-2022125167 A1 | 6/2022 |
| WO | WO-2022182660 A1 | 9/2022 |
| WO | WO-2022183175 A1 | 9/2022 |
| WO | WO-2022221243 A2 | 10/2022 |
| WO | WO-2022221243 A3 | 10/2022 |
| WO | 2023034832 | 3/2023 |
| WO | 2023039183 | 3/2023 |
| WO | 2023039390 | 3/2023 |
| WO | 2023055825 | 4/2023 |
| WO | 2023055842 | 4/2023 |

OTHER PUBLICATIONS

"U.S. Appl. No. 17/249,239, Response filed Dec. 20, 2022 to Non Final Office Action mailed Oct. 5, 2022", 10 pgs.
"U.S. Appl. No. 17/446,691, Notice of Allowance mailed Jan. 25, 2023", 5 pgs.
"U.S. Appl. No. 17/446,691, Notice of Allowance mailed Oct. 3, 2022", 8 pgs.
"U.S. Appl. No. 17/446,691, Response filed Sep. 19, 2022 to Non Final Office Action mailed Jun. 20, 2022", 10 pgs.
"U.S. Appl. No. 17/468,379, Final Office Action mailed Oct. 24, 2022", 7 pgs.
"U.S. Appl. No. 17/468,379, Notice of Allowance mailed Jan. 10, 2023", 5 pgs.
"U.S. Appl. No. 17/468,379, Response filed Oct. 4, 2022 to Non Final Office Action mailed Jul. 6, 2022", 11 pgs.
"U.S. Appl. No. 17/468,379, Response filed Dec. 13, 2022 to Final Office Action mailed Oct. 24, 2022", 10 pgs.
"U.S. Appl. No. 17/470,231, Non Final Office Action mailed Oct. 13, 2022", 22 pgs.
"U.S. Appl. No. 17/470,231, Response filed Jan. 10, 2023 to Non Final Office Action mailed Oct. 13, 2022", 9 pgs.
"U.S. Appl. No. 17/490,167, Non Final Office Action mailed Jan. 19, 2023", 13 pgs.
"U.S. Appl. No. 17/490,209, Notice of Allowance mailed Nov. 23, 2022", 9 pgs.
"U.S. Appl. No. 17/498,475, Notice of Allowance mailed Nov. 16, 2022", 11 pgs.
"U.S. Appl. No. 17/498,475, Response filed Oct. 27, 2022 to Non Final Office Action mailed Aug. 5, 2022", 9 pgs.
"Application Serial No. PCT/US2022/024364, Invitation to Pay Additional Fees mailed Sep. 15, 2022", 12 pgs.
"International Application Serial No. PCT/US2022/024364, International Search Report mailed Nov. 8, 2022", 7 pgs.
"International Application Serial No. PCT/US2022/024364, Written Opinion mailed Nov. 8, 2022", 11 pgs.
"International Application Serial No. PCT/US2022/043094, International Search Report mailed Jan. 4, 2023", 5 pgs.
"International Application Serial No. PCT/US2022/043094, Written Opinion mailed Jan. 4, 2023", 7 pgs.
"International Application Serial No. PCT/US2022/045075, International Search Report mailed Jan. 26, 2023", 4 pgs.
"International Application Serial No. PCT/US2022/045075, Written Opinion mailed Jan. 26, 2023", 6 pgs.
"International Application Serial No. PCT/US2022/075707, International Search Report mailed Dec. 20, 2022", 4 pgs.
"International Application Serial No. PCT/US2022/075707, Written Opinion mailed Dec. 20, 2022", 5 pgs.
"International Application Serial No. PCT/US2022/076006, International Search Report mailed Dec. 23, 2022", 4 pgs.
"International Application Serial No. PCT/US2022/076006, Written Opinion mailed Dec. 23, 2022", 4 pgs.
Aiyu, Cui, et al., "Dressing in Order: Recurrent Person Image Generation for Pose Transfer, Virtual Try-on and Outfit Editing", arxiv.org, Cornell University, Library, 201 Olin Library Cornell University Ithaca, NY 14853, (Aug. 31, 2021), 19 pgs.
Fei-Fei, Li, et al., "One-Shot Learning of Object Categories", IEEE Transactions on Pattern Analysis and Machine Intelligence, vol. 28, No. 4, (Apr. 2006), 18 pgs.
Hashmi, Mohammad Farukh, et al., "FashionFit: Analysis of Mapping 3D Pose and Neural Body Fit for Custom Virtual Try-On", IEEE Access, IEEE, USA, vol. 8, (May 11, 2020), 91603-91615.
Hilsmann, et al., "Tracking and Retexturing Cloth for Real-Time Virtual Clothing Applications", Springer-Verlag Berlin Heidelberg 2009, (2009), 12 pgs.
Hobley, Michael A, et al., "Say Yes to the Dress: Shape and Style Transfer Using Conditional GAN", Advances in Databases and Information Systems; [Lecture Notes in Computer Science; Lect. Notes Computer], Springer International Publishing, CHAM, (May 29, 2019), 135-149.
Liu, Li, et al., "A data-driven editing framework for automatic 3D garment modeling", Multimed Tools Appl 76, 2017, (2017), 12597-12626.
Liu, Si, et al., "Fashion Parsing With Video Context", IEEE Transactions On Multimedia, IEEE, USA, vol. 17, No. 8, (Aug. 1, 2015), 1347-1358.

(56) References Cited

OTHER PUBLICATIONS

Pons-Moll, et al., "Clothing Capture and Retargeting", ACM Transactions on Graphics, vol. 36, No. 4, (2017), 15 pgs.

Raj, Amit, et al., "SwapNet: Image Based Garment Transfer", Pattern Recognition: 5th Asian Conference, ACPR 2019, Auckland, NZ, Nov. 26-29, 2019, Revised Selected Papers, Part II; [Lecture Notes in Computer Science], Springer, CHAM, (Oct. 6, 2018), 679-695.

Wang, Lu, et al., "Crowd Counting and Segmentation in Visual Surveillance", 16th IEEE International Conference on Image Processing (ICIP), (Nov. 7-10, 2009), 4 pgs.

Xueping, Su, et al., "Personalized Clothing Recommendation Based on User Emotional Analysis", Discrete Dynamics In Nature And Society, vol. 2020, [Online]. Retrieved from the Internet: <URL:http://downloads.hindawi.com/journals/ddns/2020/7954393.xml>, (Mar. 5, 2020), 8 pgs.

Yoon, Shin Jae, et al., "Neural 3D Clothes Retargeting from a Single Image", Cornell University Library, 201 Olin Library Cornell University Ithaca, NY 14853, (Jan. 29, 2021), 20 pgs.

Zhao, Hengshuang, et al., "ICNet for Real-Time Semantic Segmentation on High-Resolution Images", Proceedings of the European Conference on Computer Vision (ECCV), (2018), 16 pgs.

"International Application Serial No. PCT/US2022/045099, International Search Report mailed Feb. 2, 2023", 5 pgs.

"International Application Serial No. PCT/US2022/045099, Written Opinion mailed Feb. 2, 2023", 9 pgs.

"U.S. Appl. No. 17/446,691, Corrected Notice of Allowability mailed Feb. 15, 2023", 2 pgs.

"U.S. Appl. No. 17/470,231, Final Office Action mailed Mar. 1, 2023", 27 pgs.

"U.S. Appl. No. 17/498,475, Notice of Allowance mailed Mar. 8, 2023", 5 pgs.

"U.S. Appl. No. 17/490,209, Notice of Allowance mailed Mar. 10, 2023", 9 pgs.

"U.S. Appl. No. 17/249,239, Final Office Action mailed Mar. 31, 2023", 27 pgs.

"U.S. Appl. No. 17/447,509, Notice of Allowance mailed Apr. 3, 2023", 8 pgs.

"U.S. Appl. No. 17/490,167, Response filed Apr. 4, 2023 to Non Final Office Action mailed Jan. 19, 2023", 10 pgs.

"U.S. Appl. No. 17/498,475, Corrected Notice of Allowability mailed Apr. 5, 2023", 2 pgs.

"U.S. Appl. No. 17/468,379, Notice of Allowance mailed Apr. 26, 2023", 7 pgs.

"U.S. Appl. No. 17/470,231, Response filed May 1, 2023 to Final Office Action mailed Mar. 1, 2023", 11 pgs.

"U.S. Appl. No. 17/490,167, Final Office Action mailed May 10, 2023", 18 pgs.

"U.S. Appl. No. 17/470,231, Advisory Action mailed May 15, 2023", 3 pgs.

"U.S. Appl. No. 17/249,239, Response filed May 17, 2023 to Final Office Action mailed Mar. 31, 2023", 10 pgs.

"U.S. Appl. No. 17/249,239, Notice of Allowance mailed Jun. 7, 2023", 9 pgs.

"U.S. Appl. No. 17/490,167, Response filed Jun. 28, 2023 to Final Office Action mailed May 10, 2023", 13 pgs.

"U.S. Appl. No. 17/470,231, Notice of Allowance mailed Jul. 7, 2023", 8 pgs.

"U.S. Appl. No. 17/490,167, Advisory Action mailed Jul. 17, 2023", 3 pgs.

"U.S. Appl. No. 17/490,167, Non Final Office Action mailed Aug. 30, 2023", 16 pgs.

"International Application Serial No. PCT/US2022/070753, International Preliminary Report on Patentability mailed Sep. 7, 2023", 8 pgs.

"International Application Serial No. PCT/US2022/017322, International Preliminary Report on Patentability mailed Sep. 7, 2023", 13 pgs.

"U.S. Appl. No. 17/490,167, Response filed Oct. 5, 2023 to Non Final Office Action mailed Aug. 30, 2023", 10 pgs.

"International Application Serial No. PCT/US2022/024364, International Preliminary Report on Patentability mailed Oct. 26, 2023", 13 pgs.

"U.S. Appl. No. 17/490,167, Final Office Action mailed Nov. 7, 2023", 17 pgs.

Hobley, Michael, "Say Yes to the Dress: Shape and Style Transfer Using Conditional GANs", Advances in Databases and Information Systems; [Lecture Notes in Computer Science; Lect.Notes Computer], Springerinternational Publishing, CHAM, Page(s) (May 29, 2019), 15 pgs.

Kanduri, "A Modular Approach for Cloth Modelling in Virtual Fitting Room", ICHIS, (2016), 106-111.

Martinsson, "Semantic Segmentation of Fashion Images Using Feature Pyramid Networks", IEEE, (2019), 4 pgs.

Yang, "Recognize the Silhouette Attributes of T-shirts based on Mask R-CNN", IEEE, (Apr. 2021), 5 pgs.

Zhaoqi, Su, "MulayCap: Multi-layer Human Performance Capture Using A Monocular Video Camera", arxiv.org, Cornell University Library, 201 Olin Library Cornell University Ithaca, NY 14853, (Oct. 1, 2020), 18 pgs.

"U.S. Appl. No. 17/470,231, Corrected Notice of Allowability mailed Dec. 27, 2023", 3 pgs.

"U.S. Appl. No. 17/490,167, Response filed Dec. 14, 2023 to Final Office Action mailed Nov. 7, 2023", 10 pgs.

"U.S. Appl. No. 18/138,269, Non Final Office Action mailed Dec. 21, 2023", 9 pgs.

U.S. Appl. No. 17/446,757, filed Sep. 2, 2021, Interactive Fashion With Music AR.

U.S. Appl. No. 17/446,691, filed Sep. 1, 2021, Controlling Interactive Fashion Based on Body Gestures.

U.S. Appl. No. 17/470,231, filed Sep. 9, 2021, Controlling Interactive Fashion Based on Facial Expressions.

U.S. Appl. No. 17/447,509, filed Sep. 13, 2021, Controlling Interactive Fashion Based on Voice.

U.S. Appl. No. 17/468,379, filed Sep. 7, 2021, Controlling AR Games on Fashion Items.

U.S. Appl. No. 17/490,167, filed Sep. 30, 2021, 3D Upper Garment Tracking.

U.S. Appl. No. 17/498,475, filed Oct. 11, 2021, Light and Rendering of Garments.

U.S. Appl. No. 17/490,209, filed Sep. 30, 2021, Body Normal Network Light and Rendering Control.

"International Application Serial No. PCT/US2022/070753, International Search Report mailed May 27, 2022", 5 pgs.

"International Application Serial No. PCT/US2022/070753, Written Opinion mailed May 27, 2022", 6 pgs.

"U.S. Appl. No. 17/446,691, Non Final Office Action mailed Jun. 20, 2022", 24 pgs.

"International Application Serial No. PCT/US2022/017322, Invitation to Pay Additional Fees mailed Jun. 7, 2022", 13 pgs.

"Clone Squad AR effect", Superfan Studio, <https://www.youtube.com/watch?v=IWRCD3BrRYg>, (May 5, 2020), 1 pg.

"Image inpainting", Yokoyalab, <https://www.youtube.com/watch?v=2ve-zK-bYRo&t=20s>, (Feb. 22, 2012), 1 pg.

"How to get invisible tiktok filter effect use the invisible filter on tiktok", How To Digital, <https://www.youtube.com/watch?v=qcYEwiLceY>, (Jan. 21, 2020), 1 pg.

"U.S. Appl. No. 17/468,379, Non Final Office Action mailed Jul. 6, 2022", 6 pgs.

"Curiscope Virtuali-Tee app", as evidenced by a YouTube video, Curiscope's VirtualiTee: Wearable tech you learn with—YouTube, [Online] Retrieved from the Internet: <URL: https://www.youtube.com/watch?v=QOHfdqgwFU>, (Mar. 1, 2016), 1 pg.

"U.S. Appl. No. 17/490,209, Notice of Allowance mailed Jul. 21, 2022", 10 pgs.

"U.S. Appl. No. 17/498,475, Non Final Office Action mailed Aug. 5, 2022", 25 pgs.

"International Application Serial No. PCT/US2022/017322, International Search Report mailed Jul. 28, 22", 7 pgs.

"International Application Serial No. PCT/US2022/017322, Written Opinion mailed Jul. 28, 2022", 11 pgs.

Bradley, "Augmented Reality on Cloth with Realistic Illumination", Machine Vison and Applications 20, (2009), 85-92.

(56) References Cited

OTHER PUBLICATIONS

Chen, Xi, "Real-time Human Segmentation using Pose Skeleton Map", 2019 Chinese Control Conference (CCC), Technical Committee on Control Theory, Chinese Association of Automation, (Jul. 27, 2019), 6 pgs.

Liu, Ting, "3D Clothing Transfer in Virtual Fitting Based on UV Mapping", 11th International Congress on Image and Signal Processing, Biomedical Engineering and Informatics (CISP-BMEI), IEEE, (Oct. 13, 2018), 6 pgs.

Wang, "Estimation of multiple directional light sources for synthesis of augmented reality images", Elsevier Science, Graphical Models 65, (Dec. 31, 2003), 185-205.

"U.S. Appl. No. 17/490,167, Notice of Allowance mailed Jan. 11, 2024", 9 pgs.

U.S. Appl. No. 18/243,444, filed Sep. 7, 2023, Whole Body Segmentation.

U.S. Appl. No. 18/138,269, filed Apr. 24, 2023, Controlling Interactive Fashion Based on Body Gestures.

U.S. Appl. No. 18/376,161, filed Oct. 3, 2023, Controlling Interactive Fashion Based on Facial Expressions.

U.S. Appl. No. 18/215,465, filed Jun. 28, 2023, Controlling Interactive Fashion Based on Voice.

"U.S. Appl. No. 17/249,241, Non Final Office Action mailed Feb. 16, 2024", 21 pgs.

"U.S. Appl. No. 18/101,673, Non Final Office Action mailed Mar. 15, 2024", 11 pgs.

"U.S. Appl. No. 18/138,269, Notice of Allowance mailed Mar. 20, 2024", 8 pgs.

"Bitmoji", Snapchat Support, [Online] Retrieved from the Internet: <URL: https://web.archive.org/web/20190503063620/https://support.snapchat.com/en-US/a/bitmoji>, (captured May 3, 2019), 2 pgs.

"Bitmoji Chrome Extension", [Online] Retrieved from the Internet: <URL: https://web.archive.org/web/20200919024925/https://support.bimoji.com/hc/en-us/articles/360001494066>, (Sep. 19, 2020), 5 pgs.

"Bitmoji Customize text", [Online] Retrieved from the Internet: <URL: https://web.archive.org/web/20210225200456/https://support.bitmoji.com/hc/en-us/articles/360034632291-Customize-Text-on-Bitmoji-Stickers>, (captured Feb. 25, 2021), 3 pgs.

"Bitmoji Family", Snapchat Support, [Online] Retrieved from the Internet: <URL: https://web.archive.org/web/20190503063620/https://support.snapchat.com/en-US/article/bitmoji-family>, (captured May 3, 2019), 4 pgs.

"Instant Comics Starring You & Your Friends", Bitstrips Inc, [Online] Retrieved from the Internet: <URL: https://web.archive.org/web/20150206000940/http://company.bitstrips.com/bitstrips-app.html>, (captured Feb. 6, 2015), 3 pgs.

"International Application Serial No. PCT/US2022/043094, International Preliminary Report on Patentability mailed Mar. 21, 2024", 9 pgs.

"International Application Serial No. PCT/US2022/075707, International Preliminary Report on Patentability mailed Mar. 14, 2024", 7 pgs.

"International Application Serial No. PCT/US2022/076006, International Preliminary Report on Patentability mailed Mar. 21, 2024", 6 pgs.

"Manage Your Bitmoji", Snapchat Support, [Online] Retrieved from the Internet: <URL: https://web.archive.org/web/20190503063620/https://support.snapchat.com/en-US/a/manage-bitmoji>, (captured May 3, 2019), 3 pgs.

"Your Own Personal Emoji", Bitstrips Inc, [Online] Retrieved from the Internet: <URL: https://web.archive.org/web/20150205232004/http://bitmoji.com/>, (captured Feb. 5, 2015), 3 pgs.

Carnahan, Daniel, "Snap is Offering Personalized Video Content Through Bitmoji TV", Business Insider, [Online] Retrieved from the Internet: <URL: https://www.businessinsider.com/snap-offers-personalized-video-content-through-bitmoji-tv-2019-12>, (2019), 10 pgs.

Constine, Josh, "Snapchat launches Bitmoji merch and comic strips starring your avatar", TechCrunch, [Online] Retrieved from the Internet: <URL: https://techcrunch.com/2018/11/13/bitmoji-store/>, (Nov. 13, 2018), 16 pgs.

Constine, Josh, "Snapchat Launches Bitmoji TV: Zany 4-min Cartoons of Your Avatar", TechCrunch, [Online] Retrieved from the Internet: <URL: https://techcrunch.com/2020/01/30/bitmoji-tv/>, (Jan. 30, 2020), 13 pgs.

Macmillan, Douglas, "Snapchat Buys Bitmoji App for More Than $100 Million", The Wallstreet Journal, [Online] Retrieved from the Internet: <URL: https://www.wsj.com/articles/snapchat-buys-bitmoji-app-for-more-than-100-million-1458876017>, (Mar. 25, 2016), 5 pgs.

Newton, Casey, "Your Snapchat friendships now have their own profiles—and merchandise", The Verge, [Online] Retrieved from the Internet: <URL: https://www.theverge.com/2018/11/13/18088772/snapchat-friendship-profiles-bitmoji-merchandise-comics>, (Nov. 13, 2018), 5 pgs.

Ong, Thuy, "Snapchat takes Bitmoji deluxe with hundreds of new customization options", The Verge, [Online] Retrieved from the Internet on Nov. 2, 2018: <URL: https://www.theverge.com/2018/1/30/16949402/bitmoji-deluxe-snapchat-customization>, (Jan. 30, 2018), 2 pgs.

Reign, Ashley, "How To Add My Friend's Bitmoji To My Snapchat", Women.com, [Online] Retrieved from the Internet: <URL: https://www.women.com/ashleyreign/lists/how-to-add-my-friends-bitmoji-to-my-snapchat>, (Jun. 30, 2017), 7 pgs.

Tumbokon, Karen, "Snapchat Update: How To Add Bitmoji To Customizable Geofilters", International Business Times, [Online] Retrieved from the Internet : <URL: https://www.ibtimes.com/snapchat-update-how-add-bitmoji-customizable-geofilters-2448152>, (Nov. 18, 2016), 6 pgs.

"U.S. Appl. No. 18/243,444, Non Final Office Action mailed Apr. 11, 2024", 9 pgs.

"International Application Serial No. PCT US2022 045075, International Preliminary Report on Patentability mailed Apr. 11, 2024", 9 pgs.

"International Application Serial No. PCT US2022 045099, International Preliminary Report on Patentability mailed Apr. 11, 2024", 11 pgs.

"U.S. Appl. No. 17/249,241, Response filed May 7, 2024 to Non Final Office Action mailed Feb. 16, 2024", 9 pgs.

\* cited by examiner

GARMENT SEGMENTATION

TECHNICAL FIELD

The present disclosure relates generally to providing augmented reality experiences using a messaging application.

BACKGROUND

Augmented-Reality (AR) is a modification of a virtual environment. For example, in Virtual Reality (VR), a user is completely immersed in a virtual world, whereas in AR, the user is immersed in a world where virtual objects are combined or superimposed on the real world. An AR system aims to generate and present virtual objects that interact realistically with a real-world environment and with each other. Examples of AR applications can include single or multiple player video games, instant messaging systems, and the like.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which.

DETAILED DESCRIPTION

Figure 1:
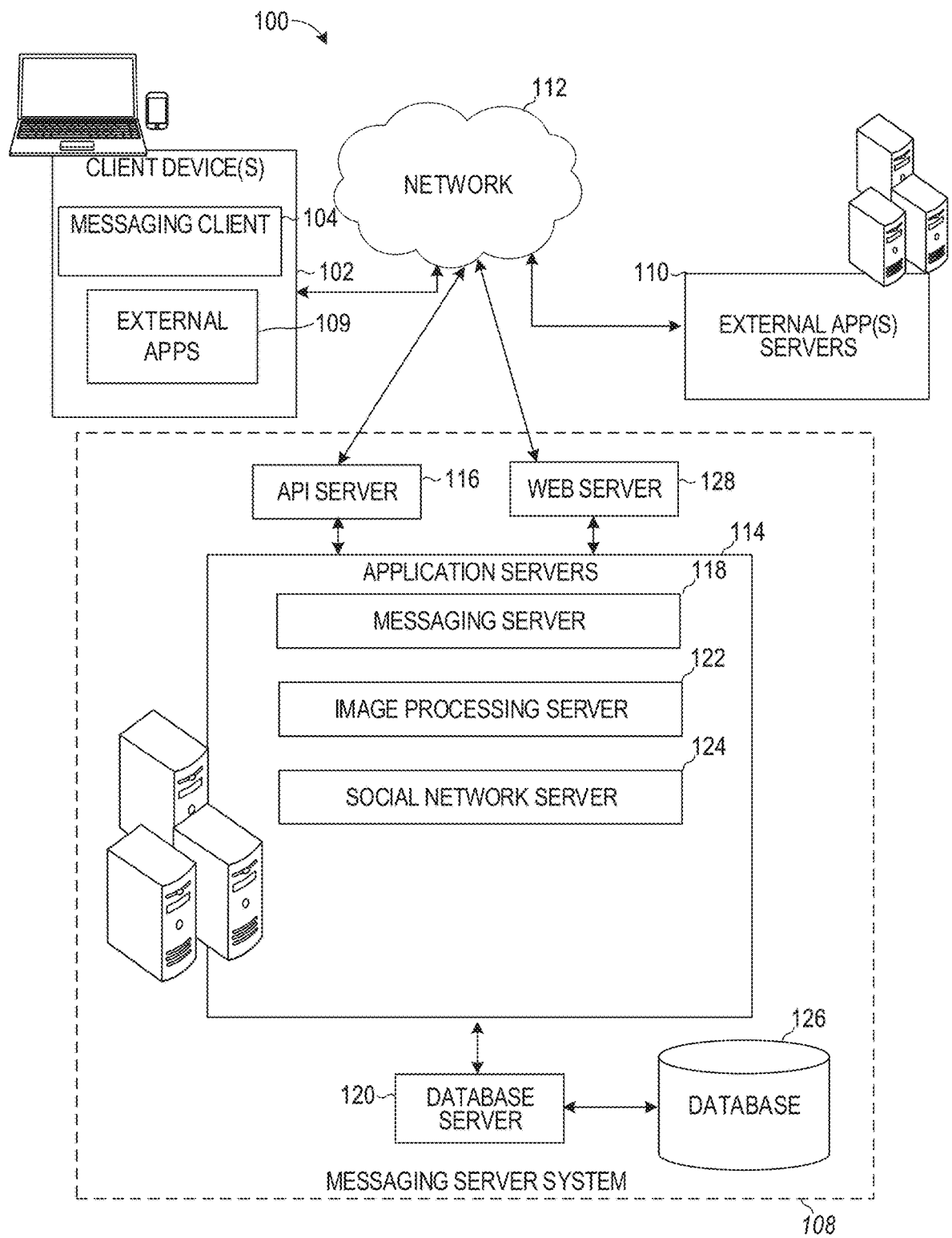
FIG. 1 is a diagrammatic representation of a networked environment in which the present disclosure may be deployed, in accordance with some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples. It will be evident, however, to those skilled in the art, that examples may be practiced without these specific details. In general, well-known instruction instances, protocols, structures, and techniques are not necessarily shown in detail.

Typically, virtual reality (VR) and augmented reality (AR) systems display images representing a given user by capturing an image of the user and, in addition, obtaining a depth map using a depth sensor of the real-world human body depicted in the image. By processing the depth map and the image together, the VR and AR systems can detect positioning of a user in the image and can appropriately modify the user or background in the images. While such systems work well, the need for a depth sensor limits the scope of their applications. This is because adding depth sensors to user devices for the purpose of modifying images increases the overall cost and complexity of the devices, making them less attractive.

Certain systems do away with the need to use depth sensors to modify images. For example, certain systems allow users to replace a background in a videoconference in which a face of the user is detected. Specifically, such systems can use specialized techniques that are optimized for recognizing a face of user to identify the background in the images that depict the user's face. These systems can then replace only those pixels that depict the background so that the real-world background is replaced with an alternate background in the images. Such systems though are generally incapable of recognizing a whole body of a user. As such, if the user is more than a threshold distance from the camera such that more than just the face of the user is captured by the camera, the replacement of the background with an alternate background begins to fail. In such cases, the image quality is severely impacted, and portions of the face and body of the user can be inadvertently removed by the system as the system falsely identifies such portions as belonging to the background rather than the foreground of the images. Also, such systems fail to properly replace the background when more than one user is depicted in the image or video feed. Because such systems are generally incapable of distinguishing a whole body of a user in an image from a background, these systems are also unable to apply visual effects to certain portions of a user's body, such as articles of clothing.

The disclosed techniques improve the efficiency of using the electronic device by segmenting articles of clothing or garments depicted in an image. By segmenting the articles of clothing or garments worn by a user or worn by different respective users depicted in an image, the disclosed techniques can apply one or more visual effects to the image, and particularly to the garments depicted in the image. Specifically, the disclosed techniques apply a first machine learning technique to generate a segmentation of a garment worn by a user depicted in an image (e.g., to distinguish pixels corresponding to the garment or multiple garments worn by the user from pixels corresponding to a background of the image or a user's body parts). The disclosed techniques then smooth, filter or improve the generated segmentation based on an estimated segmentation of the garment worn by the user depicted in the single image (e.g., a current frame of video) generated by applying a second machine learning technique to previously received video frames of the user.

Specifically, a video depicting a user's body is received. A current frame of the video is processed by a first machine learning technique to segment the garment worn by the user in the current frame. A set of previous frames, such as 1-2 seconds of video preceding the current frame, is processed by a second machine learning technique to estimate a segmentation of the garment for a subsequent frame, such as the current frame. A comparison is made between the segmentation for the current frame generated by the first machine learning technique and the estimated segmentation predicted by the second machine learning technique based on the previous frames. Any deviation or difference between the two segmentations is then corrected by the second machine learning technique to smooth, improve and filter the segmentation for the current frame generated by the first machine learning technique.

In some cases, the disclosed techniques adjust a loss function used to train the first machine learning technique based on detecting presence of a distinguishing attribute of the article of clothing (e.g., shoulder straps, collar or sleeves). For example, if a shirt sleeve is detected in the image and in the segmentation of the garment (e.g., the shirt), the loss function is adjusted during training to increase weight of the parameter adjustments made to the first machine learning technique. Namely, the manner in which different training images affect or impact parameter adjustments during training of the first machine learning technique can be based on or depend on detecting or identifying presence of the distinguishing attribute of the article of clothing or garment depicted in the training image.

In this way, the disclosed techniques can apply one or more visual effects to the garment worn by a user that has been segmented in the current image. For example, a color or texture of a shirt worn by a user depicted in the image can be replaced with a different color, texture or animation to provide an illusion that the user is wearing a different shirt than what the user is actually wearing in the image. As another example, a border of the garment itself can be enhanced or replaced with visual elements (e.g., to add a glowing effect or sparkles effect only to the portion or border of the garment). As another example, the segmentation of the garment worn by the user can be used to adjust a display of another virtual garment that is displayed in the image depicting the user. Specifically, the segmentation of the garment can be used to control an occlusion or anti-occlusion pattern effects applied to the virtual garment (e.g., pants) or real-world garment that is displayed in the image of the user. In this way, specific portions of the virtual garment (e.g., a portion of pixels of the virtual garment) can be overlaid by the real-world garment (e.g., pixel colors of the certain portions of the real-world garment worn by the user) without overlaying the entirety of the virtual garment or vice-versa. As a result, a realistic display is provided that shows the user wearing one real-world article of clothing (e.g., a shirt) while also wearing one virtual article of clothing (e.g., pants). As used herein, "article of clothing" and "garment" are used interchangeably and should be understood to have the same meaning. This improves the overall experience of the user in using the electronic device. Also, by performing such segmentations without using a depth sensor, the overall amount of system resources needed to accomplish a task is reduced.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other external applications 109 (e.g., third-party applications). Each messaging client 104 is communicatively coupled to other instances of the messaging client 104 (e.g., hosted on respective other client devices 102), a messaging server system 108 and external app(s) servers 110 via a network 112 (e.g., the Internet). A messaging client 104 can also communicate with locally-hosted third-party applications, such as external apps 109 using Application Programming Interfaces (APIs).

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Programming Interface (API) server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114, and provides web-based interfaces to the application servers 114. To this end, the web server 128 processes incoming network requests over the Hypertext Transfer Protocol (HTTP) and several other related protocols.

The Application Programming Interface (API) server 116 receives and transmits message data (e.g., commands and message payloads) between the client device 102 and the application servers 114. Specifically, the Application Programming Interface (API) server 116 provides a set of interfaces (e.g., routines and protocols) that can be called or queried by the messaging client 104 in order to invoke functionality of the application servers 114. The Application Programming Interface (API) server 116 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 118, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor- and memory-intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

Figure 2:
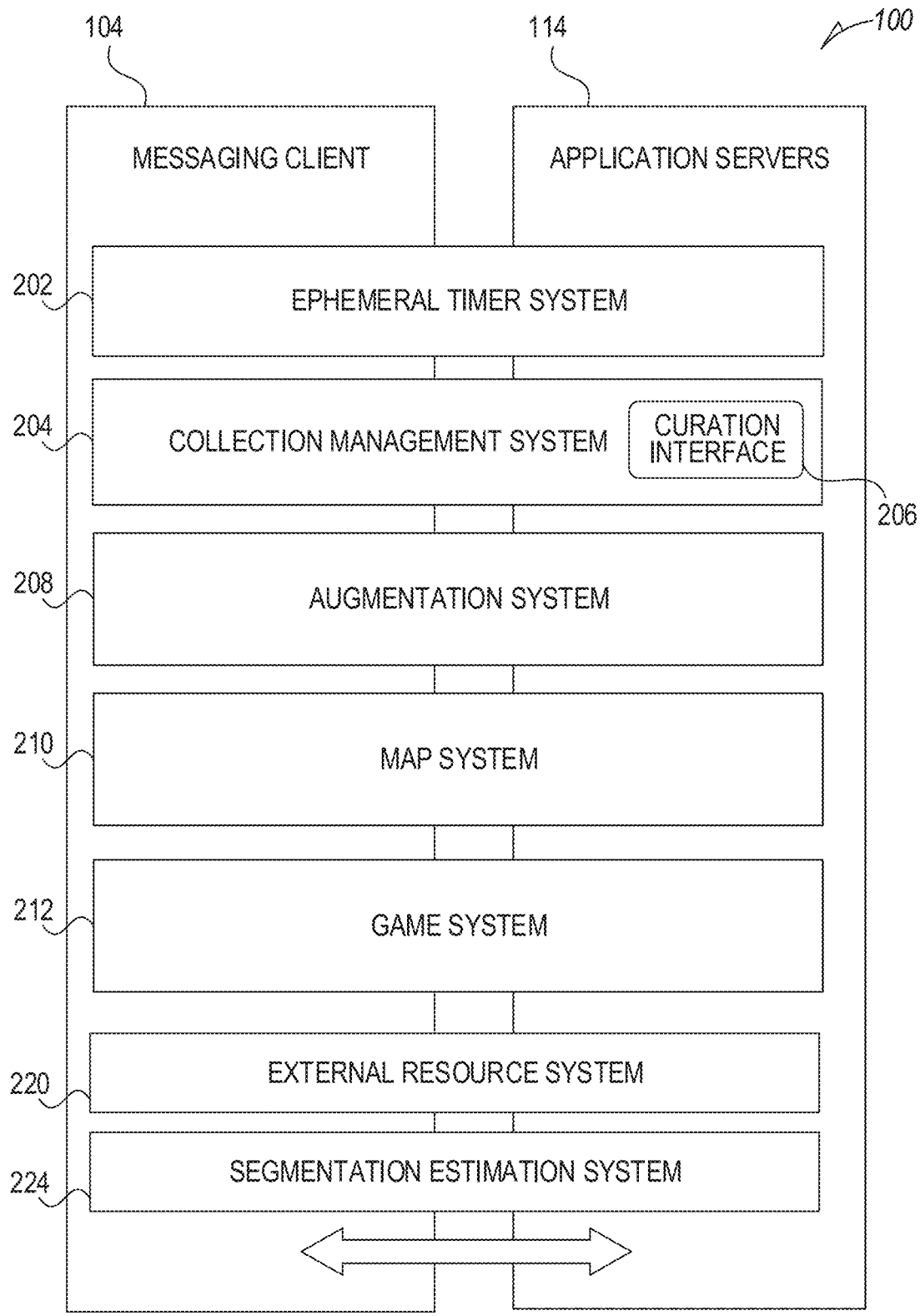
FIG. 2 is a diagrammatic representation of a messaging client application, in accordance with some examples.

Image processing server 122 is used to implement scan functionality of the augmentation system 208 (shown in FIG. 2). Scan functionality includes activating and providing one or more augmented reality experiences on a client device 102 when an image is captured by the client device 102. Specifically, the messaging client 104 on the client device 102 can be used to activate a camera. The camera displays one or more real-time images or a video to a user along with one or more icons or identifiers of one or more augmented reality experiences. The user can select a given one of the identifiers to launch the corresponding augmented reality experience or perform a desired image modification (e.g., replacing a garment being worn by a user in a video or recoloring the garment worn by the user in the video).

Figure 3:
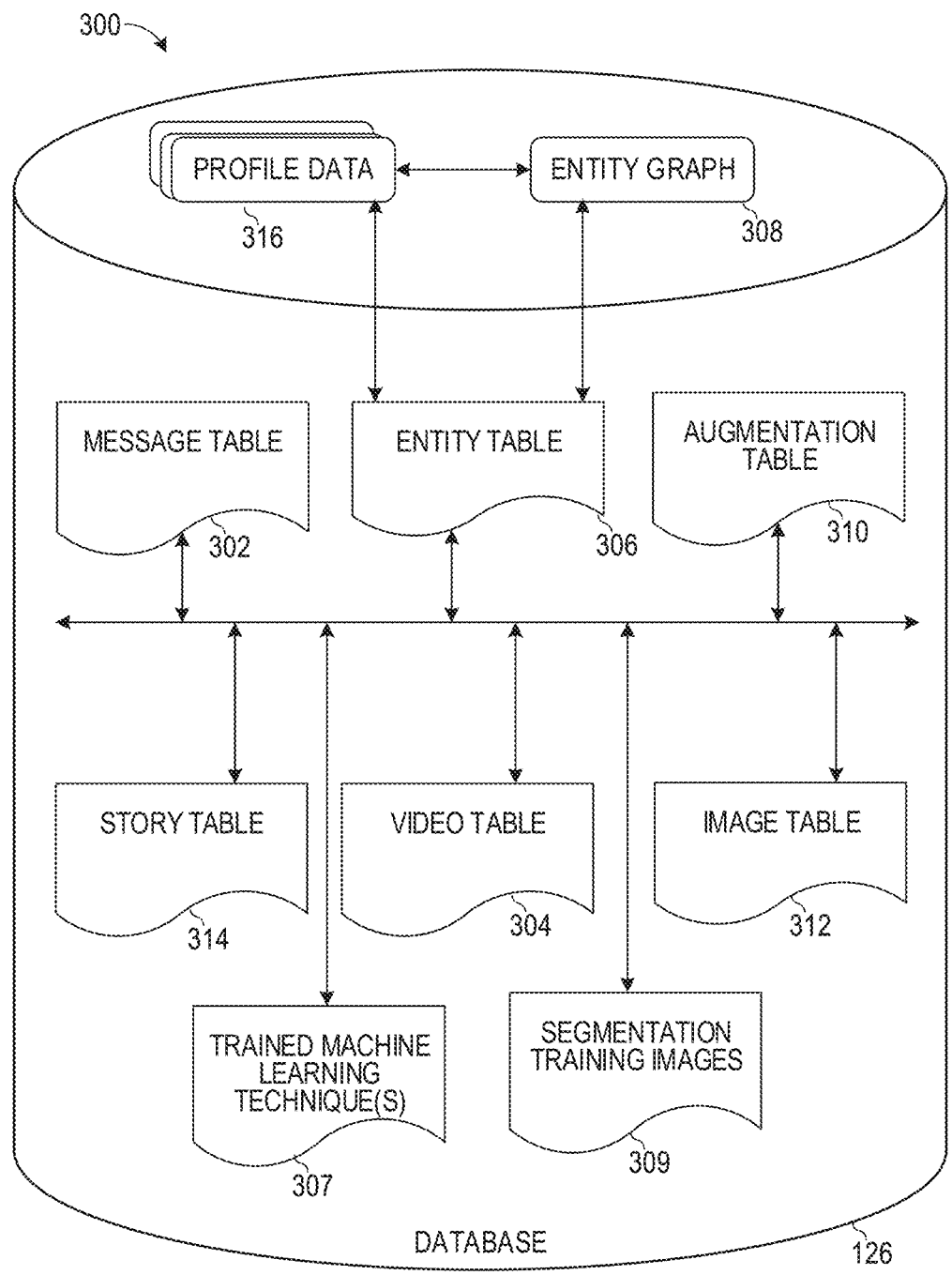
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 308 (as shown in FIG. 3) within the database 126. Examples of functions and services supported by the social network server 124 include the identification of other users of the messaging system 100 with which a particular user has relationships or is "following," and also the identification of other entities and interests of a particular user.

Returning to the messaging client 104, features and functions of an external resource (e.g., a third-party application 109 or applet) are made available to a user via an interface of the messaging client 104. The messaging client 104 receives a user selection of an option to launch or access features of an external resource (e.g., a third-party resource), such as external apps 109. The external resource may be a third-party application (external apps 109) installed on the client device 102 (e.g., a "native app"), or a small-scale version of the third-party application (e.g., an "applet") that is hosted on the client device 102 or remote of the client device 102 (e.g., on third-party servers 110). The small-scale version of the third-party application includes a subset of features and functions of the third-party application (e.g., the full-scale, native version of the third-party standalone application) and is implemented using a markup-language document. In one example, the small-scale version of the third-party application (e.g., an "applet") is a web-based, markup-language version of the third-party application and is embedded in the messaging client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource (external app 109), the messaging client 104 determines whether the selected external resource is a web-based external resource or a locally-installed external application. In some cases, external applications 109 that are locally installed on the client device 102 can be launched independently of and separately from the messaging client 104, such as by selecting an icon, corresponding to the external application 109, on a home screen of the client device 102. Small-scale versions of such external applications can be launched or accessed via the messaging client 104 and, in some examples, no or limited portions of the small-scale external application can be accessed outside of the messaging client 104. The small-scale external application can be launched by the messaging client 104 receiving, from a external app(s) server 110, a markup-language document associated with the small-scale external application and processing such a document.

In response to determining that the external resource is a locally-installed external application 109, the messaging client 104 instructs the client device 102 to launch the external application 109 by executing locally-stored code corresponding to the external application 109. In response to determining that the external resource is a web-based resource, the messaging client 104 communicates with the external app(s) servers 110 to obtain a markup-language document corresponding to the selected resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using a respective messaging client 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., third-party or external applications 109 or applets) to a user to launch or access a given external resource. This list can be presented in a context-sensitive menu. For example, the icons representing different ones of the external application 109 (or applets) can vary based on how the menu is launched by the user (e.g., from a conversation interface or from a non-conversation interface).

System Architecture

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client side by the messaging client 104 and on the sever side by the application servers 114. These subsystems include, for example, an ephemeral timer system 202, a collection management system 204, an augmentation system 208, a map system 210, a game system 212, and an external resource system 220.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 further includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text, a graphical element, or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time. The augmentation system 208 communicates with the image processing server 122 to obtain augmented reality experiences and presents identifiers of such experiences in one or more user interfaces (e.g., as icons over a real-time image or video or as thumbnails or icons in interfaces dedicated for presented identifiers of augmented reality experiences). Once an augmented reality experience is selected, one or more images, videos, or augmented reality graphical elements are retrieved and presented as an overlay on top of the images or video captured by the client device 102. In some cases, the camera is switched to a front-facing view (e.g., the front-facing camera of the client device 102 is activated in response to activation of a particular augmented reality experience) and the images from the front-facing camera of the client device 102 start being displayed on the client device 102 instead of the rear-facing camera of the client device 102. The one or more images, videos, or augmented reality graphical elements are retrieved and presented as an overlay on top of the images that are captured and displayed by the front-facing camera of the client device 102.

In other examples, the augmentation system 208 is able to communicate and exchange data with another augmentation system 208 on another client device 102 and with the server via the network 112. The data exchanged can include a session identifier that identifies the shared AR session, a transformation between a first client device 102 and a second client device 102 (e.g., a plurality of client devices 102 include the first and second devices) that is used to align the shared AR session to a common point of origin, a common coordinate frame, functions (e.g., commands to invoke functions) as well as other payload data (e.g., text, audio, video or other multimedia data).

The augmentation system 208 sends the transformation to the second client device 102 so that the second client device 102 can adjust the AR coordinate system based on the transformation. In this way, the first and second client devices 102 synch up their coordinate systems and frames for displaying content in the AR session. Specifically, the augmentation system 208 computes the point of origin of the second client device 102 in the coordinate system of the first client device 102. The augmentation system 208 can then determine an offset in the coordinate system of the second client device 102 based on the position of the point of origin from the perspective of the second client device 102 in the coordinate system of the second client device 102. This offset is used to generate the transformation so that the second client device 102 generates AR content according to a common coordinate system or frame as the first client device 102.

The augmentation system 208 can communicate with the client device 102 to establish individual or shared AR sessions. The augmentation system 208 can also be coupled to the messaging server 118 to establish an electronic group communication session (e.g., group chat, instant messaging) for the client devices 102 in a shared AR session. The electronic group communication session can be associated with a session identifier provided by the client devices 102 to gain access to the electronic group communication session and to the shared AR session. In one example, the client devices 102 first gain access to the electronic group communication session and then obtain the session identifier in the electronic group communication session that allows the client devices 102 to access the shared AR session. In some examples, the client devices 102 are able to access the shared AR session without aid or communication with the augmentation system 208 in the application servers 114.

The map system 210 provides various geographic location functions, and supports the presentation of map-based media content and messages by the messaging client 104. For example, the map system 210 enables the display of user icons or avatars (e.g., stored in profile data 316) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games (e.g., web-based games or web-based applications) that can be launched by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports both voice and text messaging (e.g., chats) within the context of gameplay, provides a leaderboard for the games, and also supports the provision of in-game rewards (e.g., coins and items).

The external resource system 220 provides an interface for the messaging client 104 to communicate with external app(s) servers 110 to launch or access external resources. Each external resource (apps) server 110 hosts, for example, a markup language (e.g., HTML5) based application or small-scale version of an external application (e.g., game, utility, payment, or ride-sharing application that is external to the messaging client 104). The messaging client 104 may launch a web-based resource (e.g., application) by accessing the HTML5 file from the external resource (apps) servers 110 associated with the web-based resource. In certain examples, applications hosted by external resource servers 110 are programmed in JavaScript leveraging a Software Development Kit (SDK) provided by the messaging server 118. The SDK includes Application Programming Interfaces (APIs) with functions that can be called or invoked by the web-based application. In certain examples, the messaging server 118 includes a JavaScript library that provides a given third-party resource access to certain user data of the messaging client 104. HTML5 is used as an example technology for programming games, but applications and resources programmed based on other technologies can be used.

In order to integrate the functions of the SDK into the web-based resource, the SDK is downloaded by an external resource (apps) server 110 from the messaging server 118 or is otherwise received by the external resource (apps) server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., third-party or external applications 109 or applets and the messaging client 104). This provides the user with a seamless experience of communicating with other users on the messaging client 104, while also preserving the look and feel of the messaging client 104. To bridge communications between an external resource and a messaging client 104, in certain examples, the SDK facilitates communication between external resource servers 110 and the messaging client 104. In certain examples, a WebViewJavaScriptBridge running on a client device 102 establishes two one-way communication channels between a external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with external resource servers 110. The SDK limits which information is shared based on the needs of the external resource. In certain examples, each external resource server 110 provides an HTML5 file corresponding to the web-based external resource to the messaging server 118. The messaging server 118 can add a visual representation (such as a box art or other graphic) of the web-based external resource in the messaging client 104. Once the user selects the visual representation or instructs the messaging client 104 through a GUI of the messaging client 104 to access features of the web-based external resource, the messaging client 104 obtains the HTML5 file and instantiates the resources necessary to access the features of the web-based external resource.

The messaging client 104 presents a graphical user interface (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another graphical user interface of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale external applications (e.g., a third-party or external application 109) are provided with access to a first type of user data (e.g., only two-dimensional avatars of users with or without different avatar characteristics). As another example, external resources that include small-scale versions of external applications (e.g., web-based versions of third-party applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

The segmentation estimation system 224 segments a garment worn by a user depicted in an image (or video) or multiple garments worn respectively by multiple users depicted in an image (or video). An illustrative implementation of the segmentation estimation system 224 is shown and described in connection with FIG. 5 below.

Specifically, the segmentation estimation system 224 is a component that can be accessed by an AR/VR application implemented on the client device 102. The AR/VR application uses an RGB camera to capture a monocular image of a user and the garment or garments worn by the user. The AR/VR application applies various trained machine learning techniques on the captured image of the user wearing the garment and one or more previous frames depicting the user wearing the same garment to segment the garment (e.g., a shirt, jacket, pants, dress, and so forth) worn by the user in the image and to apply one or more visual effects to the captured image. Segmenting the garment results in an outline of the borders of the garment that appear in the image or video. Pixels within the borders of the segmented garment correspond to the garment or clothing worn by the user. The segmented garment is used to distinguish the clothing or garment worn by the user from other objects or elements depicted in the image, such as parts of the user's body (e.g., arms, head, legs, and so forth) and the background of the image. In some implementations, the AR/VR application continuously captures images of the user wearing the garment in real time or periodically to continuously or periodically update the applied one or more visual effects. This allows the user to move around in the real world and see the one or more visual effects update in real time.

In order for AR/VR application to apply the one or more visual effects directly from a captured RGB image, the AR/VR application obtains a first trained machine learning technique from the segmentation estimation system 224. The first trained machine learning technique processes the captured RGB image to generate a segmentation from the captured image that corresponds to the garment worn by the user(s) depicted in the captured RGB image. While this disclosure discusses application of the segmentation estimation system 224 to segment a garment worn by a single user, the disclosure is similarly applicable to detecting and segmenting multiple garments worn by respective multiple users depicted simultaneously in the same image to apply respective visual effects to their garments. The AR/VR application also obtains a second trained machine learning technique from the segmentation estimation system 224. The second trained machine learning technique processes one or more previously captured frames (e.g., 1-2 seconds of video frames that immediately precede the RGB image) to estimate or predict a segmentation of the garment worn by the user for a subsequent frame. A threshold number of seconds of video frames (which may be user defined, previously specified, and/or dynamically determined) may continuously or periodically be stored in a buffer, such that the threshold number of seconds worth of video frames that precedes a current RGB image can be accessed by the second trained machine learning technique. The output or prediction of the segmentation of the second trained machine learning technique is used to smooth, filter or improve the segmentation of the garment generated by the first trained machine learning technique.

In training, the segmentation estimation system 224 obtains a first plurality of input training images that include depictions of one or more users wearing different garments. These training images also provide the ground truth information about the segmentations of the garments worn by the users depicted in each image. A first machine learning technique (e.g., a deep neural network) is trained based on features of the plurality of training images. Specifically, the first machine learning technique extracts one or more features from a given training image and estimates a segmentation of the garment worn by the user depicted in the given training image. The first machine learning technique obtains the ground truth information corresponding to the training image and adjusts or updates one or more coefficients to improve subsequent estimations of segmentations of the garment.

In training, the segmentation estimation system 224 obtains a first plurality of input training videos (each having a number of frames corresponding to a threshold video duration, such as 1-2 seconds) that include depictions of the one or more users wearing the different garments. These training videos also provide the ground truth information with segmentations of the garments for a subsequent frame relative to each video. Namely, a first training video may be associated with ground truth information identifying the segmentation of a garment worn by a user depicted in a frame immediately subsequent to a given frame in the first training video. A second machine learning technique (e.g., a neural network) is trained based on features of the plurality of training videos. Specifically, the second machine learning technique extracts one or more features from a given training video and estimates or predicts segmentations of the garment worn by the user in a subsequent frame relative to a previous frame of the training video. The second machine learning technique obtains the ground truth information corresponding to the training video and adjusts or updates one or more coefficients to improve subsequent estimations of segmentations of garments worn by the user depicted in a subsequent video.

Data Architecture

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular one message, at least message sender data, message recipient (or receiver) data, and a payload. Further details regarding information that may be included in a message, and included within the message data stored in the message table 302, is described below with reference to FIG. 4.

An entity table 306 stores entity data, and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization) interested-based or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

The database 126 can also store data pertaining to individual and shared AR sessions. This data can include data communicated between an AR session client controller of a first client device 102 and another AR session client controller of a second client device 102, and data communicated between the AR session client controller and the augmentation system 208. Data can include data used to establish the common coordinate frame of the shared AR scene, the transformation between the devices, the session identifier, images depicting a body, skeletal joint positions, wrist joint positions, feet, and so forth.

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 312 includes augmented reality content items (e.g., corresponding to applying augmented reality experiences). An augmented reality content item or augmented reality item may be a real-time special effect and sound that may be added to an image or a video.

As described above, augmentation data includes augmented reality content items, overlays, image transformations, AR images, and similar terms that refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements, characteristic points for each element of an object are calculated (e.g., using an Active Shape Model (ASM) or other known methods). Then, a mesh based on the characteristic points is generated for each of the at least one element of the object. This mesh is used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transformation system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

The graphical user interface, presenting the modification performed by the transformation system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 304 stores video data that, in one example, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

Trained machine learning technique(s) 307 stores parameters that have been trained during training of the segmentation estimation system 224. For example, trained machine learning techniques 307 stores the trained parameters of one or more neural network machine learning techniques.

Segmentation training images 309 stores a plurality of images that each depict one or more users wearing different garments. The plurality of images stored in the segmentation training images 309 includes various depictions of one or more users wearing different garments together with segmentations of the garments that indicate which pixels in the images correspond to the garments and which pixels correspond to a background or a user's body parts in the images. Namely the segmentations provide the borders of the garments depicted in the images. These segmentation training images 309 are used by the segmentation estimation system 224 to train the first machine learning technique used to generate a segmentation of one or more garments depicted in a received RGB monocular image. In some cases, the segmentation training images 309 include ground truth skeletal key points of one or more bodies depicted in the respective training monocular images to enhance segmentation performance on various distinguishing attributes (e.g., shoulder straps, collar or sleeves) of the garments. In some cases, the segmentation training images 309 include a plurality of image resolutions of bodies depicted in the images. The segmentation training images 309 can include labeled and unlabeled image and video data. The segmentation training images 309 can include a depiction of a whole body of a particular user, an image that lacks a depiction of any user (e.g., a negative image), a depiction of a plurality of users wearing different garments, and depictions of users wearing garments at different distances from an image capture device.

Segmentation training images 309 stores a plurality of videos (1-2 second video segments) that depict the one or more users wearing different garments. The plurality of videos also include ground truth information identifying the segmentations of the garments depicted in a subsequent frame relative to a current or previous frame in each of the plurality of videos. These segmentation training images 309 are used by the segmentation estimation system 224 to train the second machine learning technique to predict segmentations of a garment for a subsequent frame from a received RGB monocular video of a user wearing the garment.

Data Communications Architecture

Figure 4:
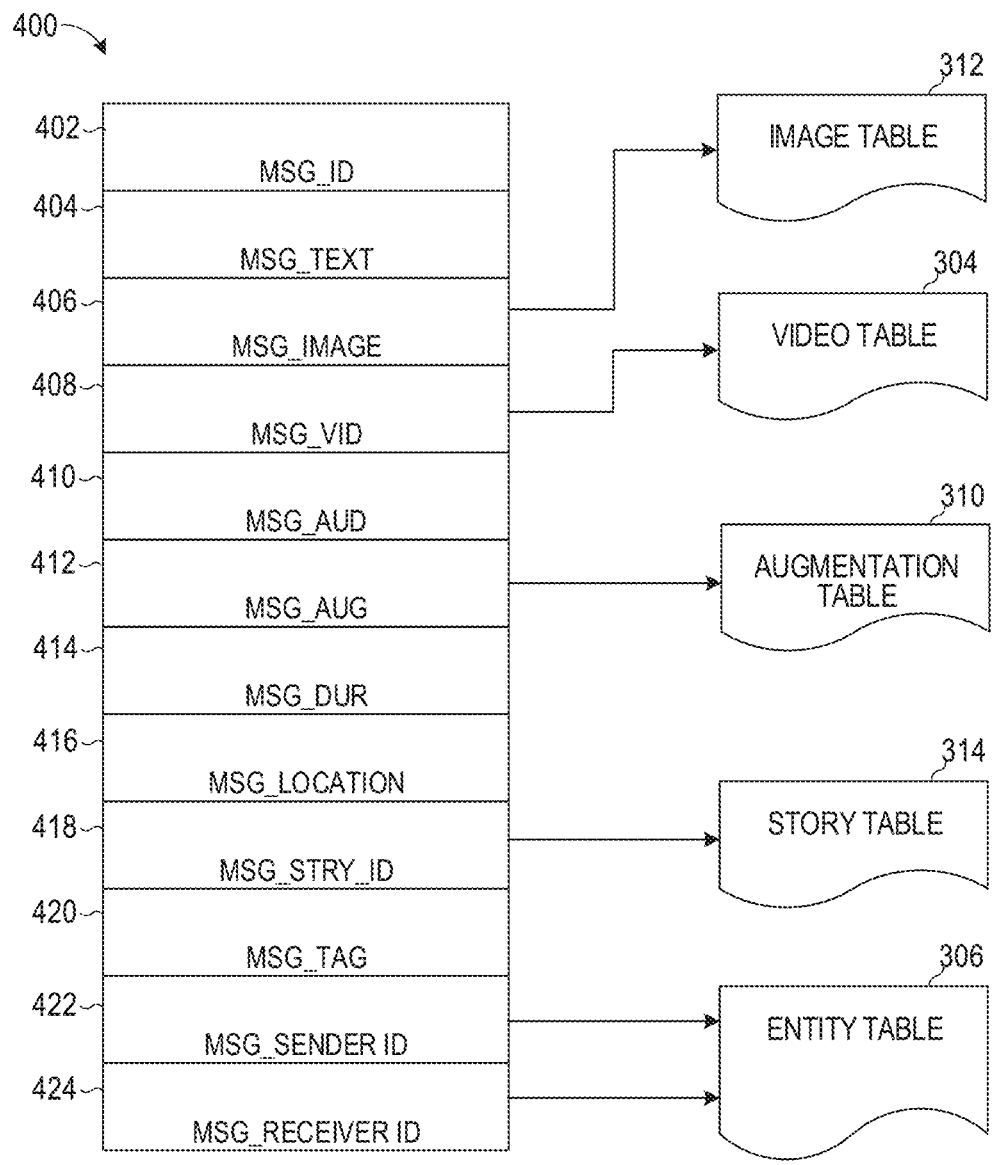
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 302 stored within the database 126, accessible by the messaging server 118. Similarly, the content of a message 400 is stored in memory as "in-transit" or "in-flight" data of the client device 102 or the application servers 114. A message 400 is shown to include the following example components:

- message identifier 402: a unique identifier that identifies the message 400.
- message text payload 404: text, to be generated by a user via a user interface of the client device 102, and that is included in the message 400.
- message image payload 406: image data, captured by a camera component of a client device 102 or retrieved from a memory component of a client device 102, and that is included in the message 400. Image data for a sent or received message 400 may be stored in the image table 312.
- message video payload 408: video data, captured by a camera component or retrieved from a memory component of the client device 102, and that is included in the message 400. Video data for a sent or received message 400 may be stored in the video table 304.
- message audio payload 410: audio data, captured by a microphone or retrieved from a memory component of the client device 102, and that is included in the message 400.
- message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.
- message duration parameter 414: parameter value indicating, in seconds, the amount of time for which content of the message (e.g., the message image payload 406, message video payload 408, message audio payload 410) is to be presented or made accessible to a user via the messaging client 104.
- message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).
- message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values.
- message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
- message sender identifier 422: an identifier (e.g., a messaging system identifier, email address, or device identifier) indicative of a user of the client device 102 on which the message 400 was generated and from which the message 400 was sent.
- message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentation data 412 may point to data stored in an augmentation table 310, values stored within the message story identifier 418 may point to data stored in a story table 314, and values stored within the message sender identifier 422 and the message receiver identifier 424 may point to user records stored within an entity table 306.

Segmentation Estimation System

Figure 5:
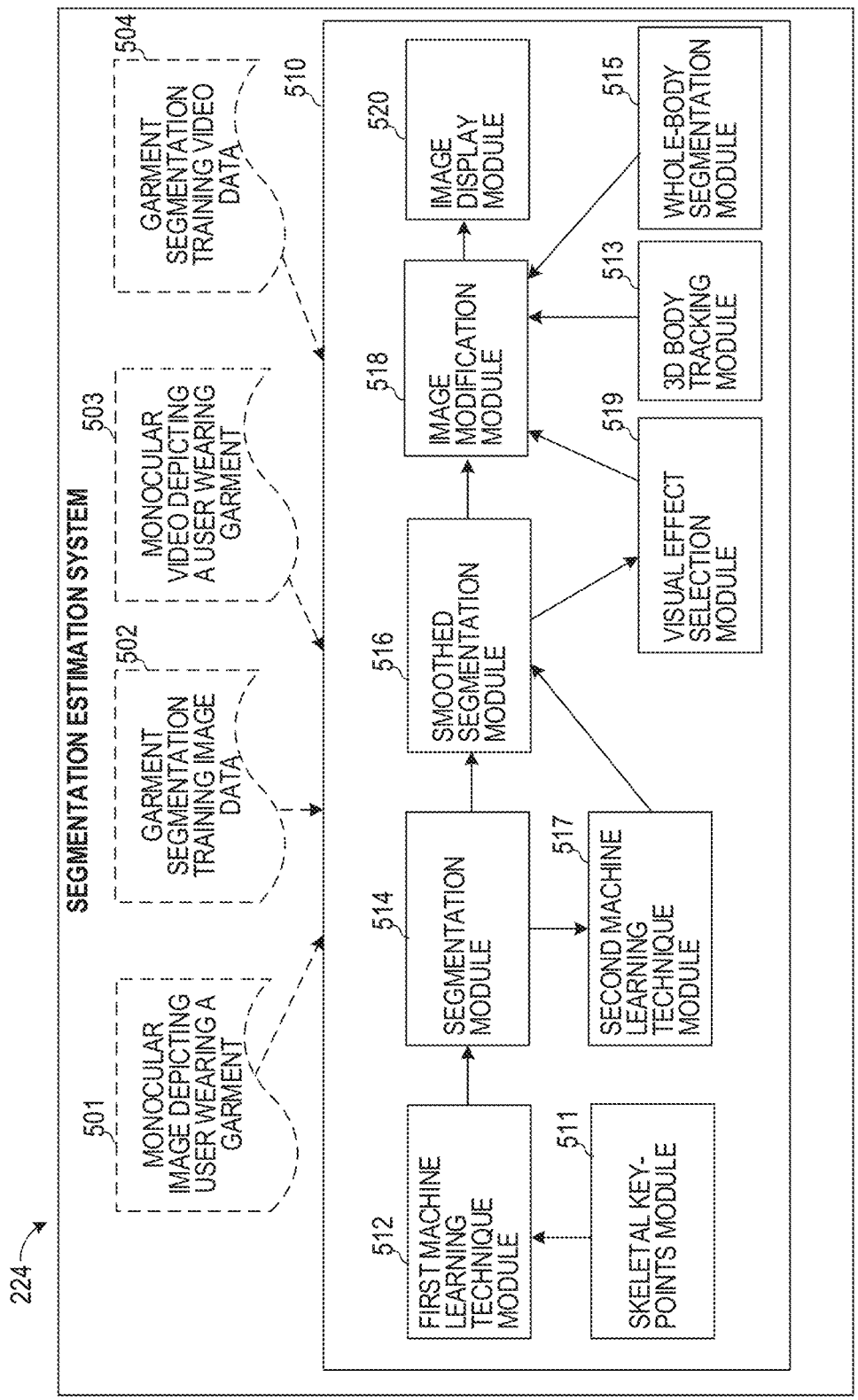
FIG. 5 is a block diagram showing an example segmentation estimation system, according to example examples.

FIG. 5 is a block diagram showing an example segmentation estimation system 224, according to example examples. Segmentation estimation system 224 includes a set of components 510 that operate on a set of input data (e.g., a monocular image 501 depicting a real body of a user wearing a garment, segmentation training image data 502, monocular video 503 depicting a user wearing a garment, and garment segmentation training video data 504). The set of input data is obtained from segmentation training images 309 stored in database(s) (FIG. 3) during the training phases and is obtained from an RGB camera of a client device 102 when an AR/VR application is being used, such as by a messaging client 104. Segmentation estimation system 224 includes a first machine learning technique module 512, a skeletal key-points module 511, a segmentation module 514, a second machine learning technique module 517, a smoothed segmentation module 516, an image modification module 518, a visual effect selection module 519, a 3D body tracking module 513, a whole-body segmentation module 515, and an image display module 520.

During training, the segmentation estimation system 224 receives a given training image (e.g., monocular image 501 depicting a real body of a user wearing a garment, such as an image of a user wearing an upper body garment, such as a shirt (short sleeve, t-shirt, or long sleeve), jacket, tank top, sweater, and so forth, a lower body garment, such as pants or a skirt, a whole body garment, such as a dress or overcoat, or any suitable combination thereof or depicting multiple users simultaneously wearing respective combinations of upper body garments, lower body garments or whole body garments) from segmentation training image data 502. The segmentation estimation system 224 applies one or more machine learning techniques using the first machine learning technique module 512 on the given training image. The first machine learning technique module 512 extracts one or more features from the given training image to estimate a segmentation of the garment(s) worn by the user(s) depicted in the image. For example, the first machine learning technique module 512 obtains the given training image depicting a user wearing a shirt. The first machine learning technique module 512 extracts features from the image and segments or specifies which pixels in the image correspond to the shirt worn by the user and which pixels correspond to a background or correspond to parts of the user's body. Namely, the segmentation output by the first machine learning technique module 512 identifies borders of a garment (e.g., the shirt) worn by the user in given training image.

The first machine learning technique module 512 retrieves garment segmentation information associated with the given training image. The first machine learning technique module 512 compares the estimated segmentation (that can include an identification of multiple garments worn by respective users in the image in case there exist multiple users in the image) with the ground truth garment segmentation provided as part of the segmentation training image data 502. Based on a difference threshold or deviation of the comparison, the first machine learning technique module 512 updates one or more coefficients and obtains one or more additional segmentation training images. After a specified number of epochs or batches of training images have been processed and/or when the difference threshold or deviation reaches a specified value, the first machine learning technique module 512 completes training and the parameters and coefficients of the first machine learning technique module 512 are stored in the trained machine learning technique(s) 307.

In some examples, the first machine learning technique module 512 implements multiple segmentation models of the first machine learning technique. Each segmentation model of the first machine learning technique may be trained on a different set of training images associated with a specific resolution. Namely, one of the segmentation models can be trained to estimate a garment segmentation for images having a first resolution (or a first range of resolutions). A second of the segmentation models can be trained to estimate a garment segmentation for images having a second resolution (or a second range of resolutions different from the first range of resolutions). In this way, different complexities of the first machine learning technique can be trained and stored. When a given device having certain capabilities uses the AR/VR application, a corresponding one of the various garment segmentation models can be provided to perform the garment segmentation that matches the capabilities of the given device. In some cases, multiple garment segmentation models of each of the machine leaning techniques implemented by the segmentation estimation system 224 can be provided each configured to operate with a different level of complexity. The appropriate segmentation model(s) with the appropriate level of complexity can then be provided to a client device 102 for segmenting garments depicted in one or more images.

In some examples, during training, the first machine learning technique module 512 receives 2D skeletal joint information from a skeletal key-points module 511. The skeletal key-points module 511 tracks skeletal key points of a user depicted in a given training image (e.g., head joint, shoulder joints, hip joints, leg joints, and so forth) and provides the 2D or 3D coordinates of the skeletal key points. This information is used by the first machine learning technique module 512 to identify distinguishing attributes of the garment depicted in the training image. The process for detecting and tracking the skeletal key points is discussed in commonly owned, Assouline et al. U.S. patent application Ser. No. 16/949,607, filed Nov. 6, 2020, which is incorporated by reference in its entirety.

The garment segmentation generated by the first machine learning technique module 512 is provided to the segmentation module 514. The segmentation module 514 can determine that the elbow joint output by the skeletal key-points module 511 is at a position that is within a threshold distance away from a given edge of the border of the garment segmentation. In response, the segmentation module 514 can determine that the garment corresponds to a t-shirt or short sleeve shirt and that the given edge corresponds to a sleeve of the shirt. In such circumstances, the segmentation module 514 can adjust weights of the parameters or the loss function used to update parameters of the first machine learning technique module 512 to improve segmentation of upper body garments, such as shirts. More specifically, the segmentation module 514 can determine that a given distinguishing attribute is present in the garment segmentation that is generated based on a comparison of skeletal joint positions to borders of the garment segmentation. In such circumstances, the segmentation module 514 adjusts the loss function or weights used to update the parameters of the first machine learning technique module 512 for the training image depicting the garment with the distinguishing attribute. Similarly, the segmentation module 514 can adjust the loss or the parameter weights based on a difference between the garment segmentation and the pixels corresponding to the background of the image.

During training, segmentation estimation system 224 receives a given training video (e.g., monocular video 503 depicting a user wearing a garment (or combination of garments) or depicting multiple users simultaneously in a video wearing respective garments (or combination of garments)) from segmentation training image data 502. The segmentation estimation system 224 applies one or more machine learning techniques using the second machine learning technique module 517 on the given training video. The second machine learning technique module 517 extracts one or more features from the given training video to predict a garment segmentation (of the one or more users) for a frame subsequent to the current or previous frame of the video. For example, the second machine learning technique module 517 obtains the given training video depicting movement of a user wearing a garment (or combination of garments) across a set of frames in 1-2 seconds of video. The second machine learning technique module 517 extracts features from the video to predict a garment segmentation of the garment (or combination of garments) worn by the user or multiple users in a frame that is subsequent to a current or previous frame of the video.

The second machine learning technique module 517 predicts the garment segmentation for one or more subsequent frames that follow the given training video frame. For example, the second machine learning technique module 517 may process frames 2-25 of a given video to predict a garment segmentation of a garment worn by a user depicted in frame 26 of the same video. The second machine learning technique module 517 compares the determined/predicted garment segmentation with the ground truth garment segmentation provided as part of the segmentation training image data 502. The ground truth segmentation may provide the ground truth garment segmentation for the frame 26 for movement of a garment worn by a user depicted in frames 2-25. Based on a difference threshold or deviation of the comparison, the second machine learning technique module 517 updates one or more coefficients and obtains one or more additional segmentation training videos. After a specified number of epochs or batches of training videos have been processed and/or when the difference threshold or deviation reaches a specified value, the second machine learning technique module 517 completes training and the parameters and coefficients of the second machine learning technique module 517 are stored in the trained machine learning technique(s) 307.

Specifically, the second machine learning technique module 517 processes a sequence of video frames that immediately precede the current frame by 1-2 seconds. The second machine learning technique module 517 analyzes movement of the garment segmentation across the sequence of the video frames to predict an estimated garment segmentation in the current frame or for a frame that is subsequent to the current frame.

After training, segmentation estimation system 224 receives an input image 501 (e.g., monocular image depicting a user wearing a garment or multiple users wearing respective garments) as a single RGB image from a client device 102. The segmentation estimation system 224 applies the first trained machine learning technique module 512 to the received input image 501 to extract one or more features representing the segmentation of the garment or garments depicted in the image 501. The segmentation estimation system 224 also receives a set of frames of a monocular video 503 captured prior to the image 501 that depict the same user or users wearing the respective garments. The segmentation estimation system 224 applies the second trained machine learning technique module 517 to the received monocular video 503 to generate a prediction or estimation of the garment segmentation in a subsequent frame (e.g., to generate a prediction of the garment segmentation in the current frame, such as in image 501). Namely, the segmentation estimation system 224 generates a segmentation of the garment from a current input image and a prediction of the segmentation that appears in the current input image from one or more previously received images or frames of a video.

The smoothed segmentation module 516 compares the estimated garment segmentation for the current frame generated by the first machine learning technique module 512 with the predicted garment segmentation generated by the second machine learning technique module 517. The smoothed segmentation module 516 adjusts, smooths or filters any differences in the garment segmentation to generate a smoothed garment segmentation for the current frame. In some cases, the smoothed segmentation module 516 generates a garment segmentation border based on the smoothed segmentation. The garment segmentation border indicates a set of pixels that are positioned at a border or the edges of the garment segmentation. Namely, the garment segmentation border pixels correspond to pixels between a background and the garment and between the garment and parts of the body of the user depicted in the image. In some cases, the garment segmentation border pixels have a specified width (e.g., 3-4 pixels) in which case, the garment segmentation border represents edges of the garment segmentation of the specified width. In some cases, the smoothed segmentation module 516 applies a guided filter to the smoothed segmentation to improve garment segmentation quality of portions of the smoothed garment segmentations that are within a specified number of pixels of edges of the smoothed segmentation.

The number of previous video frames or duration of the previously received video segments analyzed by the second machine learning technique module 517 may be set by a user, predetermined, or dynamically adjusted. In some cases, the number of previous video frames that are analyzed may be increased (e.g., from 1 second of video to 2 seconds of video) if the amount of filtering or correction of the segmentation determined by the first machine learning technique module 512 exceeds a specified threshold. In some cases, the number of previous video frames that are analyzed may be increased (e.g., from 1 second of video to 2 seconds of video) based on a distance between a user and a camera exceeding a specified threshold.

In some cases, the first machine learning technique module 512 is trained to generate segmentations for upper body garments. In such cases, when presented with an image of only legs of a user, the first machine learning technique module 512 does not generate a garment segmentation. In such examples, the first machine learning technique module 512 is trained using training images that depict users wearing upper body garments. Similarly, the second machine learning technique module 517 is trained to generate predictions of segmentations for upper body garments. In such examples, the second machine learning technique module 517 is trained using training videos that depict users wearing upper body garments. In these examples, when an image is received that depicts a whole body of a user, the segmentation estimation system 224 provides only a segmentation of the upper body garment (e.g., shirt or jacket) worn by the user and ignores or does not provide a segmentation for any other garment worn by the user (e.g., pants).

Figure 6:
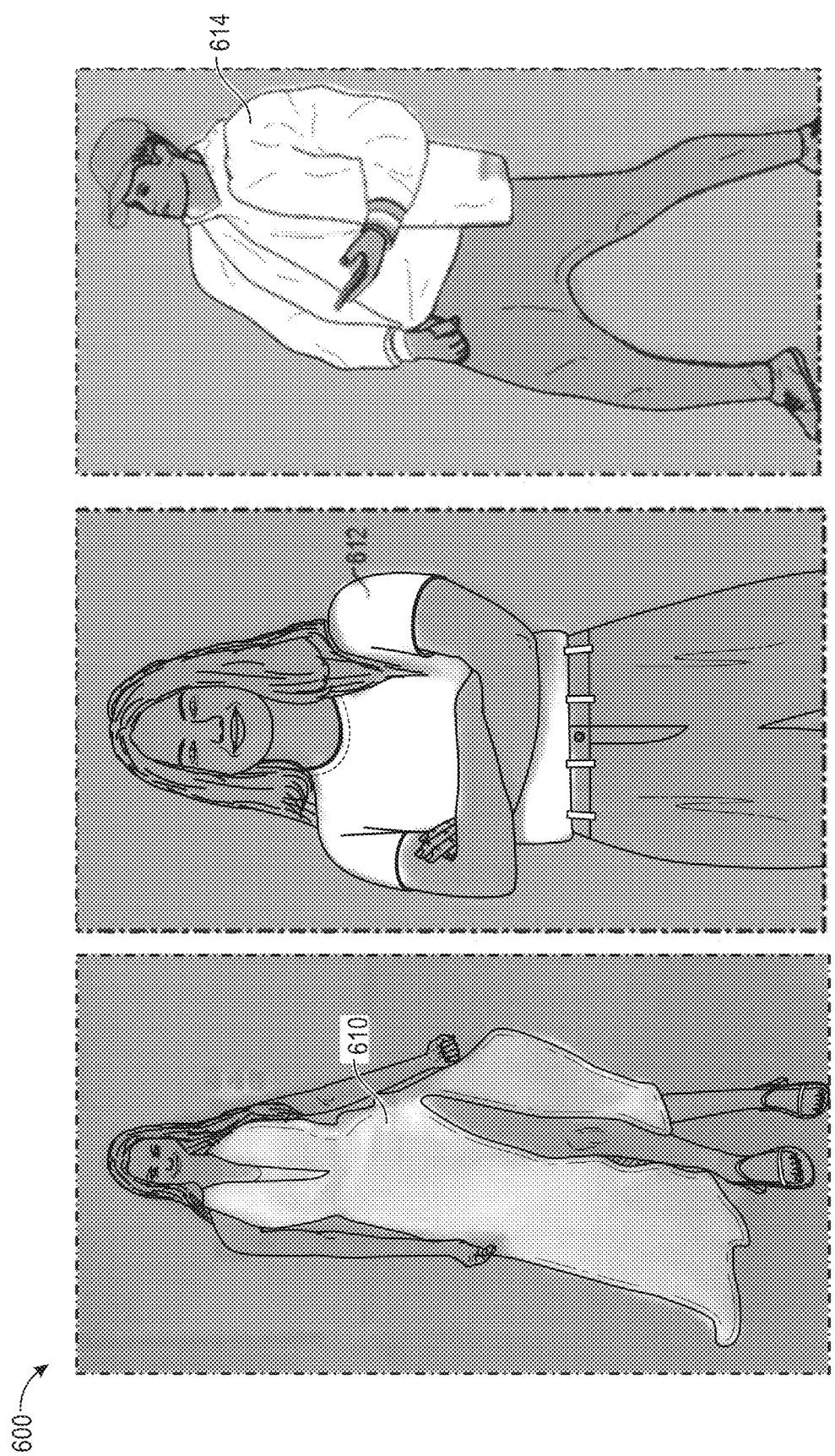
FIGS. 6, 7A, 7B, 8 and 9 are diagrammatic representations of outputs of the segmentation estimation system, in accordance with some examples.

FIG. 6 is a diagrammatic representation of outputs of the segmentation estimation system 224, in accordance with some examples. Specifically, FIG. 6 shows a plurality of garment segmentations 600 generated by the smoothed segmentation module 516. In one example, the smoothed segmentation module 516 generates a first garment segmentation 610 representing pixel locations of a dress worn by a user. In another example, the smoothed segmentation module 516 generates a second garment segmentation 612 representing pixel locations of a short sleeve shirt worn by a user. In another example, the smoothed segmentation module 516 generates a third garment segmentation 614 representing pixel locations of a jacket worn by a user.

Referring back to FIG. 5, visual effect selection module 519 receives from a client device 102 a selection of a virtualization mode. For example, a user of the AR/VR application may be presented with a list of mode options. In response to receiving a user selection of a given mode option from the list, the given mode is provided to the visual effect selection module 519 as the selection of the virtualization mode. The mode options may include: a replace the garment with another garment option: recolor pixels of the garment option (e.g., to change the color of each pixel of the image that falls within the garment segmentation with a target pixel color, texture or animation); apply an animation or video to a region within the garment segmentation option (e.g., to replace each pixel of the image that falls within the garment segmentation with a target animation or video); present ripples, sparkles or particles to the border or portions of the border of the garment segmentation option (e.g., to apply one or more augmented reality elements to a region of the image corresponding to the border of the garment segmentation); remove the garment option (e.g., set all the pixel values within the garment segmentation to a specified value, such as black or white); and option to apply a contour effect to the garment segmentation, adjust display locations and occlusion patterns of a virtual garment (e.g., pants) that is displayed next to or adjacent to the garment (e.g., a shirt) corresponding to the garment segmentation. The virtualization mode selection controls the way in which the segmentation of the garment worn by the user affects the display of visual elements in the image relative to the user. FIGS. 7A, 7B, 8 and 9 show illustrative outputs of one or more of the options that can be selected by the visual effect selection module 519.

The image modification module 518 can adjust the image captured by the camera based on the mode selected by the visual effect selection module 519 and the smoothed garment segmentation received from the smoothed segmentation module 516. The image modification module 518 adjusts the way in which the garment worn by the user is/are presented in an image, such as by changing the color or occlusion pattern of the garment worn by the user based on the garment segmentation. Image display module 520 combines the adjustments made by the image modification module 518 into the received monocular image depicting the user's body. The image is provided by the image display module 520 to the client device 102 and can then be sent to another user or stored for later access and display.

In some examples, the image modification module 518 receives 3D body tracking information representing the 3D positions of the user depicted in the image from the 3D body tracking module 513. The 3D body tracking module 513 generates the 3D body tracking information by processing the image 501 and the monocular video 503 using fifth and sixth machine learning techniques. As an example, the fifth trained machine learning technique processes the captured RGB image to generate a skeletal joint locations from the captured image that correspond to the body depicted in the captured RGB image. The sixth trained machine learning technique processes one or more previously captured frames (e.g., 1-2 seconds of video frames that immediately precede the RGB image) to estimate or predict the skeletal joint locations for a subsequent frame. A threshold number of seconds of video frames (which may be user defined, previously specified, and/or dynamically determined) may continuously or periodically be stored in a buffer, such that the threshold number of seconds worth of video frames that precedes a current RGB image can be accessed by the sixth trained machine learning technique. The output or prediction of the skeletal joint locations of the sixth trained machine learning technique is used to smooth, filter or improve the skeletal joint locations generated by the fifth trained machine learning technique. This results in 3D skeletal joint positions of the user depicted in an image.

The image modification module 518 can also receive a whole-body segmentation representing which pixels in the image correspond to the whole body of the user. The whole-body segmentation can be received from the whole-body segmentation module 515. The whole-body segmentation module 515 generates the whole body segmentation by processing the image 501 and the monocular video 503 using third and fourth machine learning techniques. As an example, the third trained machine learning technique processes the captured RGB image to generate a segmentation from the captured image that correspond to the body depicted in the captured RGB image. The fourth trained machine learning technique processes one or more previously captured frames (e.g., 1-2 seconds of video frames that immediately precede the RGB image) to estimate or predict a segmentation for a subsequent frame. A threshold number of seconds of video frames (which may be user defined, previously specified, and/or dynamically determined) may continuously or periodically be stored in a buffer, such that the threshold number of seconds worth of video frames that precedes a current RGB image can be accessed by the fourth trained machine learning technique. The output or prediction of the segmentation of the fourth trained machine learning technique is used to smooth, filter or improve the segmentation generated by the third trained machine learning technique. This results in a whole-body segmentation of the user.

As an example, the image modification module 518 can control the display of another virtual or augmented reality element based on the garment segmentation provided by the smoothed segmentation module 516 and based on the 3D body tracking positions of the user and the whole-body segmentation of the user. Specifically, the image modification module 518 can control the occlusion pattern of a virtual garment relative to the real-world garment corresponding to the garment segmentation. For example, the image modification module 518 can adjust or modify an image captured by the client device 102 in real-time in a layered multi-parts approach. In a first layer or part, the image modification module 518 can use the 3D body tracking positions of the user to adjust a pose of the virtual (or augmented reality) garment that is to be displayed on top of the user depicted in a received image. Namely, if the left leg of the user is angled relative to the user's torso in a given direction, the virtual garment is similarly angled to overlap the leg of the user. In a second layer or part, the whole-body segmentation of the user is used to place pixels of the virtual garment on the corresponding part of the user's body, such as the legs of the user when the virtual garment corresponds to pants. The whole-body segmentation is also used to blend pixels of the virtual garment with the background portion that is adjacent to the user's body part (e.g., legs) corresponding to the virtual garment (e.g., pants). In a third layer or part, the image modification module 518 can use the garment segmentation corresponding to the real-world garment (e.g., shirt) worn by the user depicted in the received image to occlude the virtual garment according to an occlusion pattern (e.g., the real-world garment occludes the virtual garment or the virtual garment occludes the real-world garment). Namely, the image modification module 518 determines which portion of the virtual garment to occlude with pixels of the real-world garment and/or also determines which portion of the real-world garment pixels to occlude with pixels of the virtual garment.

For example, the visual effect selection module 519 may receive input that selects a virtual pants garment to be added to a captured image or video. In response, the image modification module 518 can access the 3D body tracking information for the user depicted in the image from the 3D body tracking module 513 to pose the virtual pants garment in a manner that resembles a currently depicted pose of the user's legs corresponding to the virtual pants garment. The image modification module 518 positions the virtual pants garment on top of the user's pants in a manner that blends with a background of the image based on the whole-body segmentation received from the whole-body segmentation module 515.

In one example, the image modification module 518 can select an occlusion pattern for the virtual pants garment based on the current occlusion pattern of the real-world clothes the user is wearing. Namely, the image modification module 518 can determine that the real-world pants worn by the user overlap the real-world shirt in the image. In this case, the image modification module 518 sets the occlusion pattern such that the virtual pants garment overlaps a portion of the real-world shirt garment corresponding to the garment segmentation received from the smoothed segmentation module 516. As another example, the image modification module 518 can select an occlusion pattern for the virtual pants garment based on the current occlusion pattern associated with the selected virtual pants garment. Namely, the image modification module 518 can determine that the virtual pants garment is associated with an occlusion pattern in which the virtual pants overlap the real-world shirt in the image. In this case, the image modification module 518 sets the occlusion pattern such that the virtual pants garment overlaps a portion of the real-world shirt garment corresponding to the garment segmentation received from the smoothed segmentation module 516. As another example, the image modification module 518 can determine that the virtual pants garment is associated with an occlusion pattern in which the virtual pants are occluded by the real-world shirt in the image. In this case, the image modification module 518 sets the occlusion pattern such that the virtual pants garment are overlapped by a portion of the real-world shirt garment corresponding to the garment segmentation received from the smoothed segmentation module 516.

The image modification module 518 determines which subset of pixels of the real-world shirt overlap a subset of pixels of the virtual garment. If the occlusion pattern indicates that the virtual pants garment occludes the real-world shirt garment, the image modification module 518 replaces the subset of pixels of the real-world shirt with the subset of pixels of the virtual garment. If the occlusion pattern indicates that the virtual pants garment is occluded by the real-world shirt garment, the image modification module 518 replaces the subset of pixels of the virtual pants garment with the subset of pixels of the real-world shirt garment.

Figure 7A:
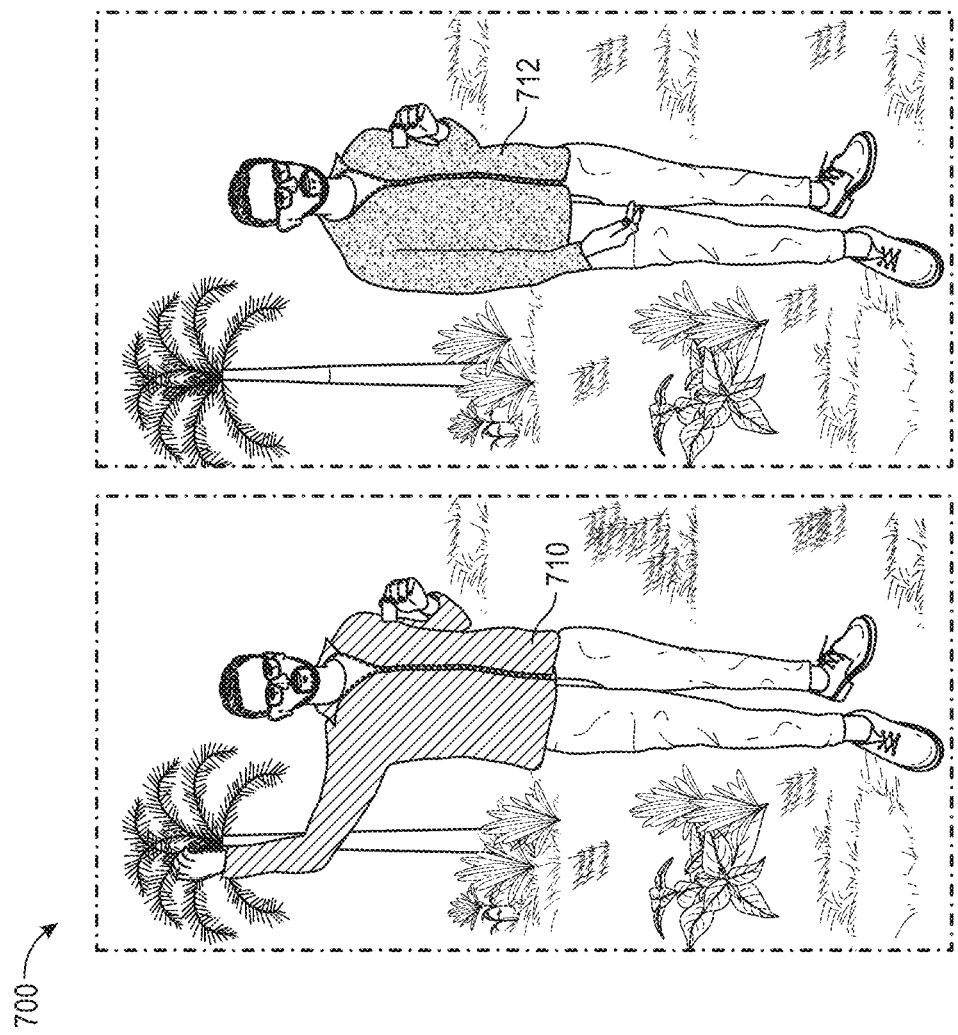

FIGS. 7A, 7B, 8 and 9 are diagrammatic representations of outputs of the segmentation estimation system, in accordance with some examples. In one example, as shown in FIG. 7A, the segmentation estimation system 224 can modify a pixel color of pixels corresponding to the real-world garment worn by the user in the monocular image or video. Specifically, the segmentation estimation system 224 can receive a monocular image 700. The segmentation estimation system 224 can generate a smoothed segmentation (e.g., smoothed segmentation 610), as discussed above. The segmentation estimation system 224 can determine that the garment segmentation of the garment worn by the user corresponds to the collection of pixels 710. The segmentation estimation system 224 can receive a user input that navigates a user interface element to modify the color of the garment pixels. In response, the segmentation estimation system 224 generates an image in which the collection of pixels 710 corresponding to the garment (e.g., the pixels within the garment segmentation) have been replaced by another color 712.

Specifically, as shown in FIG. 7A, the visualization mode selected by the user can include a selection of a recolor option. In response to receiving the selection of this option, the segmentation estimation system 224 identifies pixels of the monocular image corresponding to a garment (e.g., the collection of pixels 710) of the monocular image based on the garment segmentation (e.g., the segmentation 610). The segmentation estimation system 224 replaces the collection of pixels 710 of the monocular image with a different color 712, image or video.

Figure 7B:
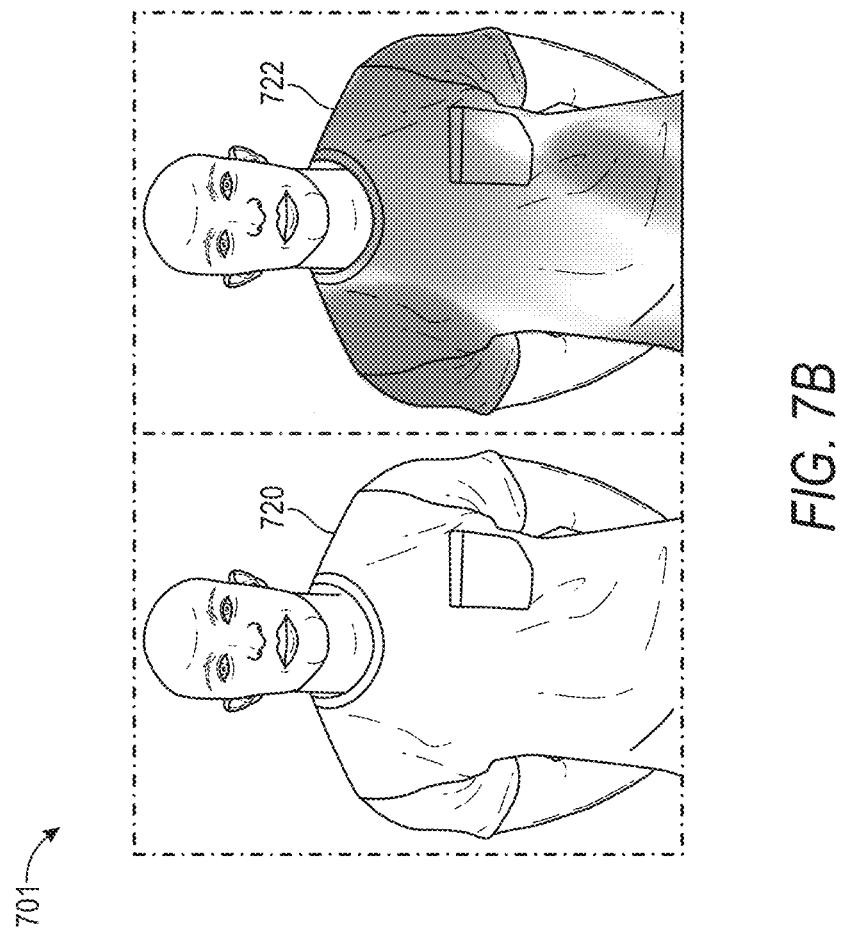

In some cases, the visualization mode selected by the user can include also a texture modification option. In this case, in addition to or alternative to replacing pixel colors of the pixels within the garment segmentation, the segmentation estimation system 224 replaces the texture of the pixels of the garment worn by the user depicted in the image. Specifically, as shown in FIG. 7B, the segmentation estimation system 224 identifies a collection of pixels 720 of the monocular image corresponding to the garment worn by the user based on the segmentation (e.g., the segmentation 610). The segmentation estimation system 224 changes a texture of one or more portions of the collection of pixels 720 to another texture 722. Specifically, the segmentation estimation system 224 replaces the collection of pixels 720 of the monocular image corresponding to the garment worn by the user with target pixel values corresponding to a different image, video or texture 722. In some cases, the target pixel values to which the portion of the collection of pixels is changed is selected by the user, such as by navigating a user interface element.

In some cases, the visualization mode selected by the user can include also an occlusion option. In this case, in addition to or alternative to replacing pixels of the garment, the segmentation estimation system 224 adds one or more graphical elements to pixels of the garment depicted in the image. Specifically, the segmentation estimation system 224 identifying a collection of pixels 710 of the monocular image corresponding to the garment worn by the user based on the segmentation (e.g., the segmentation 610). The segmentation estimation system 224 retrieves a graphical element (e.g., augmented reality wings, horns, or outfit, or other user selected graphical element). The segmentation estimation system 224 selects a display position for the graphical element based on user input or based on a type of graphical element that has been retrieved. The segmentation estimation system 224 identifies a set of pixels in the collection of pixels corresponding to the garment worn by the user. The segmentation estimation system 224 adds the retrieved graphical element adjacent to or in replacement of the identified set of pixels. For example, the segmentation estimation system 224 adds wings to a set of pixels associated with sleeves of the garment segmentation.

In some cases, the segmentation estimation system 224 accesses a segmentation border of the garment worn by the user depicted in the image in response to receiving a contour option. In this case, the segmentation estimation system 224 can add the graphical element as extending from the segmentation border. For example, the segmentation estimation system 224 adds a shadow or glow around a segmentation border of the garment worn by the user depicted in the image. This results in an appearance of a glow, sparkles, ripples, particles, or shadow around or behind edges of the garment worn by the user depicted in the image. Specifically, the segmentation estimation system 224 identifies a border of the garment worn by the user based on edges of the collection of pixels of the garment segmentation. The segmentation estimation system 224 adds a glow, sparkles, ripples, particles, or shadow graphical element along the border of the garment worn by the user.

Figure 8:
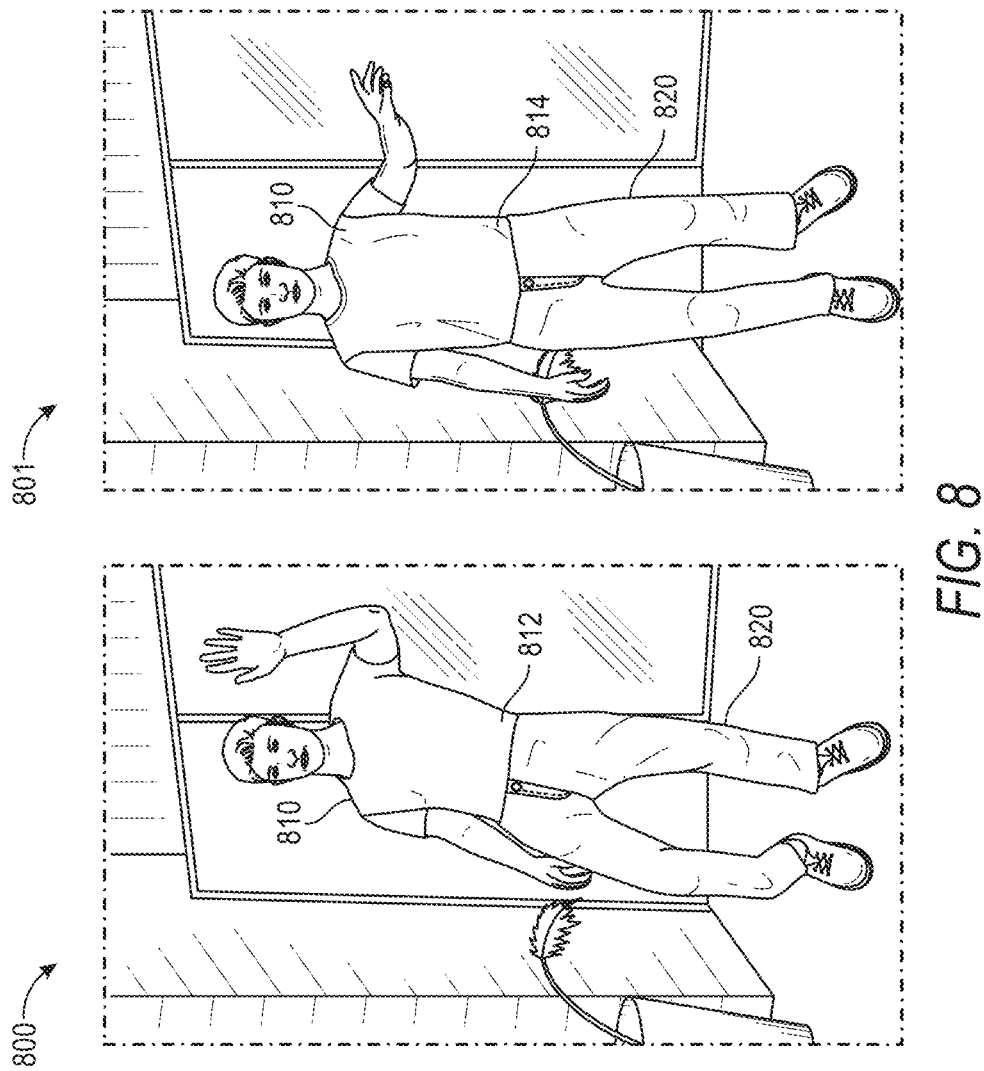

FIG. 8 shows an example of displaying a virtual garment together with a real-world garment according to a first occlusion pattern. For example, a first image 800 depicts a user in a first pose. The user is wearing a real-world garment 810 for which a garment segmentation is generated by the segmentation estimation system 224. The visual effect selection module 519 may receive input that selects a virtual pants garment 820 to be added to the image 800. In response, the image modification module 518 can access the 3D body tracking information for the user depicted in the image 800 from the 3D body tracking module 513 to pose the virtual pants garment 820 in a manner that resembles a currently depicted pose of the user's legs corresponding to the virtual pants garment. The image modification module 518 positions the virtual pants garment on top of the user's legs in a manner that blends with a background of the image 800 based on the whole-body segmentation received from the whole-body segmentation module 515.

The image modification module 518 can select an occlusion pattern for the virtual pants garment in which the virtual pants garment 820 overlaps the real-world shirt in the image. Namely, the image modification module 518 sets the occlusion pattern such that the virtual pants garment 820 overlaps a portion of the real-world garment 810 (e.g., a short sleeve shirt) corresponding to the garment segmentation received from the smoothed segmentation module 516. The image modification module 518 determines which subset of pixels 812 of the real-world garment 810 overlap a subset of pixels of the virtual pants garment 820. The image modification module 518 replaces the subset of pixels 812 of the real-world garment 810 that are within the overlap region in the garment segmentation of the real-world garment 810 with the subset of pixels of the virtual pants garment 820. This gives the illusion that the real-world garment 810 is tucked inside of the virtual pants garment 820.

As the user moves around in the video, the positioning and the occlusion pattern is changed in real time. For example, when a subsequent frame of the video is received as a second image 801, the position of the real-world garment 810 changes in the second image 801 relative to the first image 800. As a result, an updated garment segmentation is generated and used to control the occlusion pattern of the real-world garment 810 relative to the virtual pants garment 820. Specifically, the image modification module 518 can access the 3D body tracking information for the user depicted in the image 801 from the 3D body tracking module 513 to update the pose of the virtual pants garment 820 in a manner that resembles a currently depicted pose of the user's legs corresponding to the virtual pants garment 820. The image modification module 518 positions the virtual pants garment 820 on top of the user's legs in a manner that blends with a background of the image 801 based on the whole-body segmentation received from the whole-body segmentation module 515.

The image modification module 518 updates the occlusion pattern such that the virtual pants garment 820 continues to appear to overlap the real-world garment 810 from the first image 800 to the second image 801. Namely, in the second image 801, the virtual pants garment 820 overlaps a portion of the real-world garment 810 (e.g., a short sleeve shirt) corresponding to the garment segmentation received from the smoothed segmentation module 516. In this case, the image modification module 518 determines which subset of pixels 814 of the real-world garment 810 overlap a subset of pixels of the virtual garment 820 in the second image 801 relative to the first image 800. The image modification module 518 replaces the subset of pixels 814 of the real-world garment 810 that are within the overlap region in the garment segmentation of the real-world garment 810 with the subset of pixels of the virtual garment 820.

Figure 9:
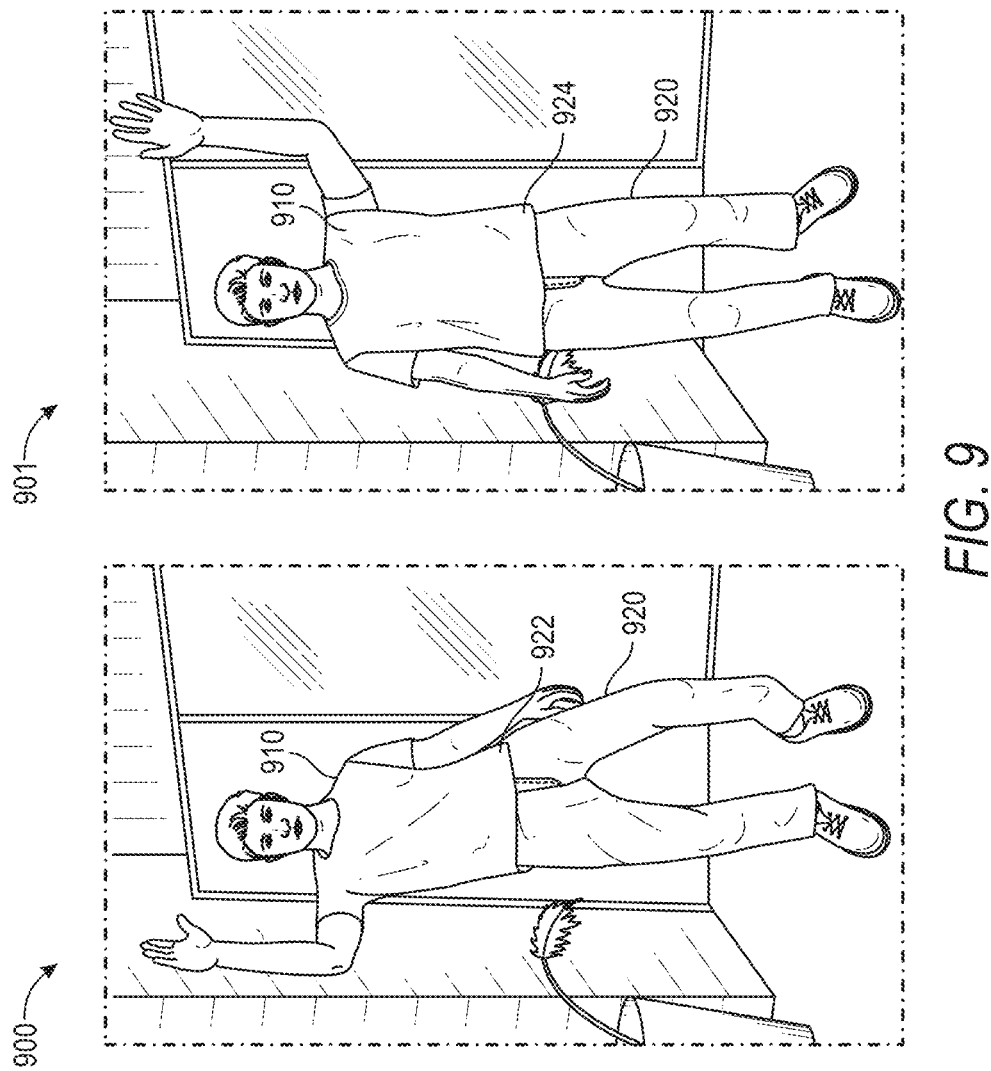

FIG. 9 shows an example of displaying a virtual garment together with a real-world garment according to a second occlusion pattern. For example, a first image 900 depicts a user in a first pose. The user is wearing a real-world garment 910 for which a garment segmentation is generated by the segmentation estimation system 224. The visual effect selection module 519 may receive input that selects a virtual pants garment 920 to be added to the image 900. In response, the image modification module 518 can access the 3D body tracking information for the user depicted in the image 900 from the 3D body tracking module 513 to pose the virtual pants garment 920 in a manner that resembles a currently depicted pose of the user's legs corresponding to the virtual pants garment. The image modification module 518 positions the virtual pants garment 920 on top of the user's legs in a manner that blends with a background of the image 900 based on the whole-body segmentation received from the whole-body segmentation module 515.

The image modification module 518 can select an occlusion pattern for the virtual pants garment in which the real-world garment 910 overlaps the virtual pants garment 920. Namely, the image modification module 518 sets the occlusion pattern such that the virtual pants garment 920 are overlapped by a portion of the real-world garment 910 (e.g., a short sleeve shirt) corresponding to the garment segmentation received from the smoothed segmentation module 516. The image modification module 518 determines which subset of pixels of the real-world garment 910 overlap a subset of pixels 922 of the virtual garment 920. The image modification module 518 replaces the subset of pixels 922 of the virtual pants garment 920 with the subset of pixels of the real-world garment 910 that are within the overlap region in the garment segmentation of the real-world garment 910. This gives the illusion that the real-world garment 810 is draped over the virtual garment 920.

As the user moves around in the video, the positioning and the occlusion pattern is changed in real time. For example, when a subsequent frame of the video is received as a second image 901, the position of the real-world garment 910 changes in the second image 901 relative to the first image 900. As a result, an updated garment segmentation is generated and used to control the occlusion pattern of the real-world garment 910 relative to the virtual garment 920. Specifically, the image modification module 518 can access the 3D body tracking information for the user depicted in the image 901 from the 3D body tracking module 513 to update the pose of the virtual pants garment 920 in a manner that resembles a currently depicted pose of the user's legs corresponding to the virtual pants garment. The image modification module 518 positions the virtual pants garment 920 on top of the user's legs in a manner that blends with a background of the image 901 based on the whole-body segmentation received from the whole-body segmentation module 515.

The image modification module 518 updates the occlusion pattern such that the virtual pants garment 920 continues to appear to be overlapped by the real-world garment 910 from the first image 900 to the second image 901. Namely, in the second image 901, the virtual pants garment 920 is overlapped by a portion of the real-world garment 910 (e.g., a short sleeve shirt) corresponding to the garment segmentation received from the smoothed segmentation module 516. In this case, the image modification module 518 determines which subset of pixels 924 of the virtual pants garment 920 are overlapping a subset of pixels of the real-world garment 910 in the second image 901 relative to the first image 900. The image modification module 518 replaces the subset of pixels 924 of the virtual pants garment 920 with the subset of pixels of the real-world garment 910 that are within the overlap region in the garment segmentation of the real-world garment 910.

Figure 10A:
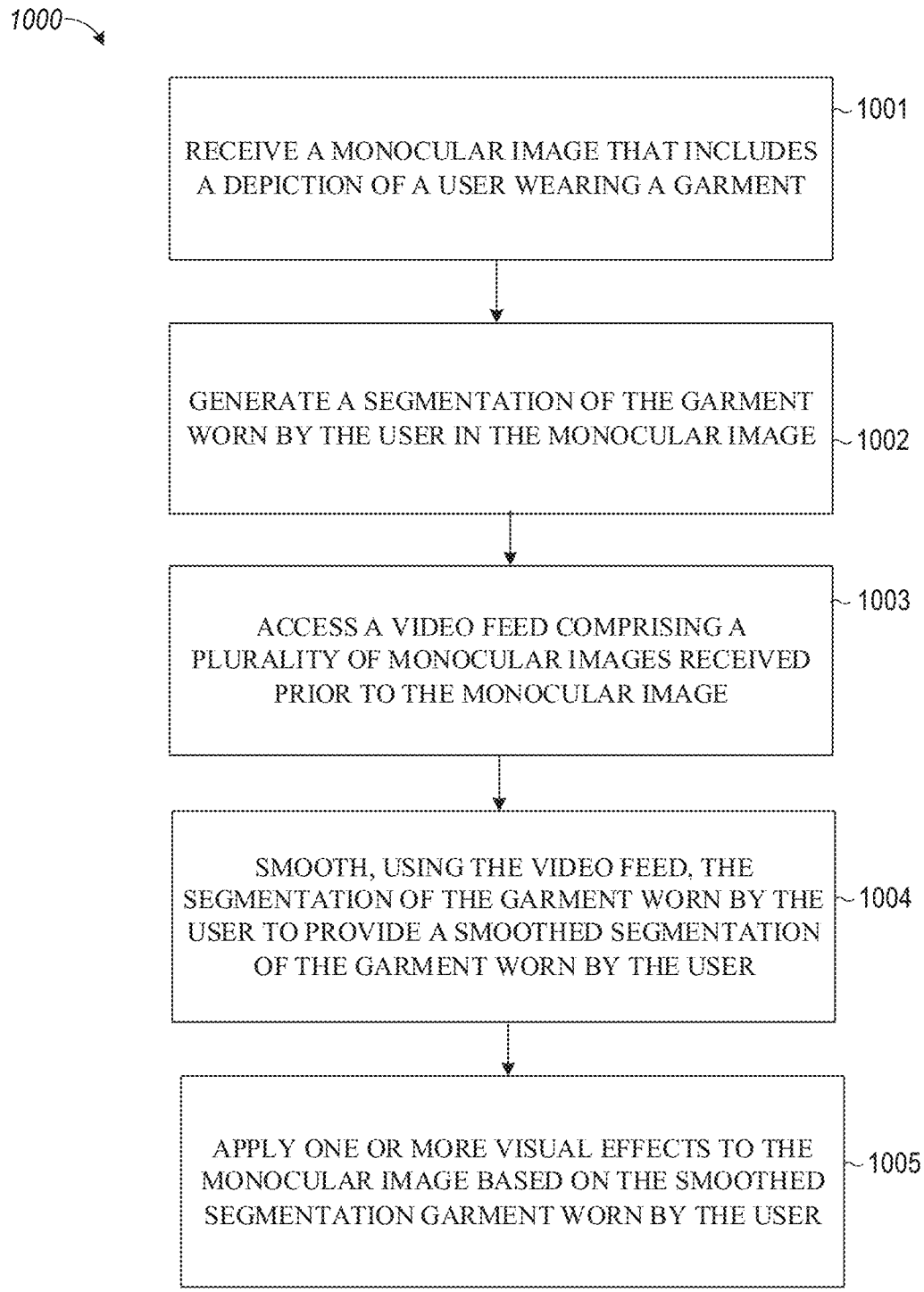
FIGS. 10A and 10B are flowcharts illustrating example operations of the messaging application server, according to examples.

FIG. 10A is a flowchart of a process 1000 for generating a garment segmentation worn by a user depicted in an image, in accordance with some example examples. Although the flowcharts can describe the operations as a sequential process, many of the operations can be performed in parallel or concurrently. In addition, the order of the operations may be re-arranged. A process is terminated when its operations are completed. A process may correspond to a method, a procedure, and the like. The steps of methods may be performed in whole or in part, may be performed in conjunction with some or all of the steps in other methods, and may be performed by any number of different systems or any portion thereof, such as a processor included in any of the systems.

At operation 1001, a client device 102 receives a monocular image that includes a depiction of a user wearing a garment. For example, the segmentation estimation system 224 can capture an image that depicts one or more users (e.g., a plurality of users) wearing respective one or more garments.

At operation 1002, the client device 102 generates a segmentation of the garment worn by the user in the monocular image. As an example, the segmentation estimation system 224 can generate a plurality of segmentations of the plurality of garments worn by respective users in an image by applying a first machine learning technique module 512 to the image.

At operation 1003, the client device 102 accesses a video feed comprising a plurality of monocular images received prior to the monocular image, as discussed above. For example, the segmentation estimation system 224 can apply a second machine learning technique module 517 to a plurality of previously received images that respectively depict the garment worn by the user to predict garment segmentations of the garment worn by the user for the currently received image.

At operation 1004, the client device 102 smooths, using the video feed, the segmentation of the garment worn by the user generated based on the monocular image to provide a smoothed garment segmentation, as discussed above. For example, the segmentation estimation system 224 can compute a deviation between the one or more segmentations of the one or more garments generated based on the first machine learning technique module 512 with the predicted segmentations generated by the second machine learning technique module 517. The segmentation estimation system 224 can modify the segmentation generated by the first machine learning technique module 512 based on the deviation.

At operation 1005, the client device 102 applies one or more visual effects to the monocular image based on the smoothed garment segmentation, as discussed above. For example, the segmentation estimation system 224 can replace the garment with another garment, recolor pixels of the garment, apply an animation or video to a region within the garment segmentation, present ripples, sparkles or particles to the border or portions of the border of the garment segmentation, remove the garment, apply a contour effect to the garment segmentation, adjust display locations and occlusion patterns of a virtual garment (e.g., pants) that is displayed next to or adjacent to the garment (e.g., a shirt) corresponding to the garment segmentation.

Figure 10B:
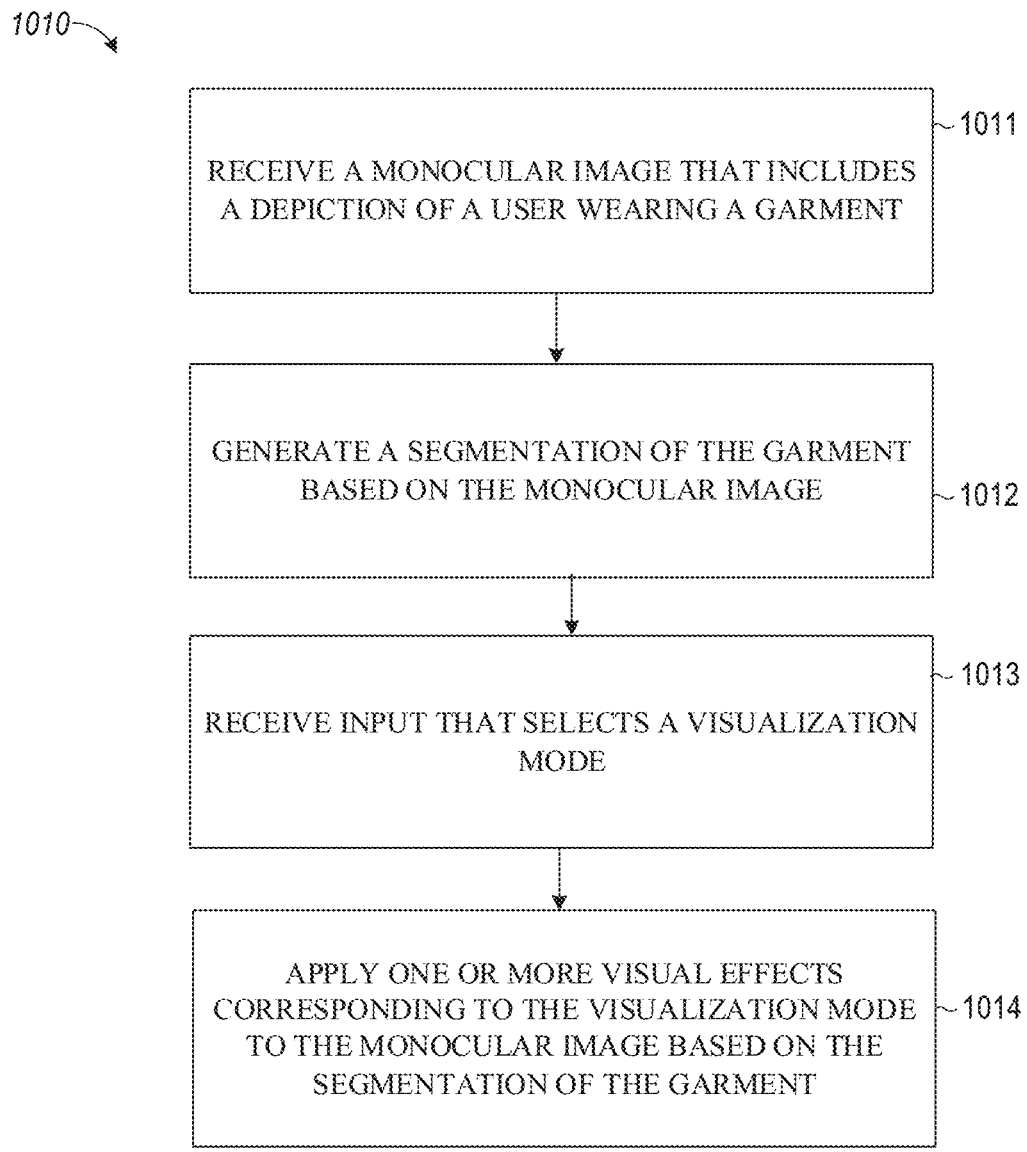

FIG. 10B is a flowchart of a process 1010 for generating a garment segmentation of a garment worn by a user depicted in an image, in accordance with some example examples. Although the flowcharts can describe the operations as a sequential process, many of the operations can be performed in parallel or concurrently. In addition, the order of the operations may be re-arranged. A process is terminated when its operations are completed. A process may correspond to a method, a procedure, and the like. The steps of methods may be performed in whole or in part, may be performed in conjunction with some or all of the steps in other methods, and may be performed by any number of different systems or any portion thereof, such as a processor included in any of the systems.

At operation 1011, a client device 102 receives a monocular image that includes a depiction of a user wearing a garment, as discussed above.

At operation 1012, the client device 102 generates a segmentation of the garment worn by the user based on the monocular image, as discussed above.

At operation 1013, the client device 102 receives input that selects a visualization mode, as discussed above.

At operation 1014, the client device 102 applies one or more visual effects corresponding to the visualization mode to the monocular image based on the segmentation of the garment, as discussed above.

Machine Architecture

Figure 11:
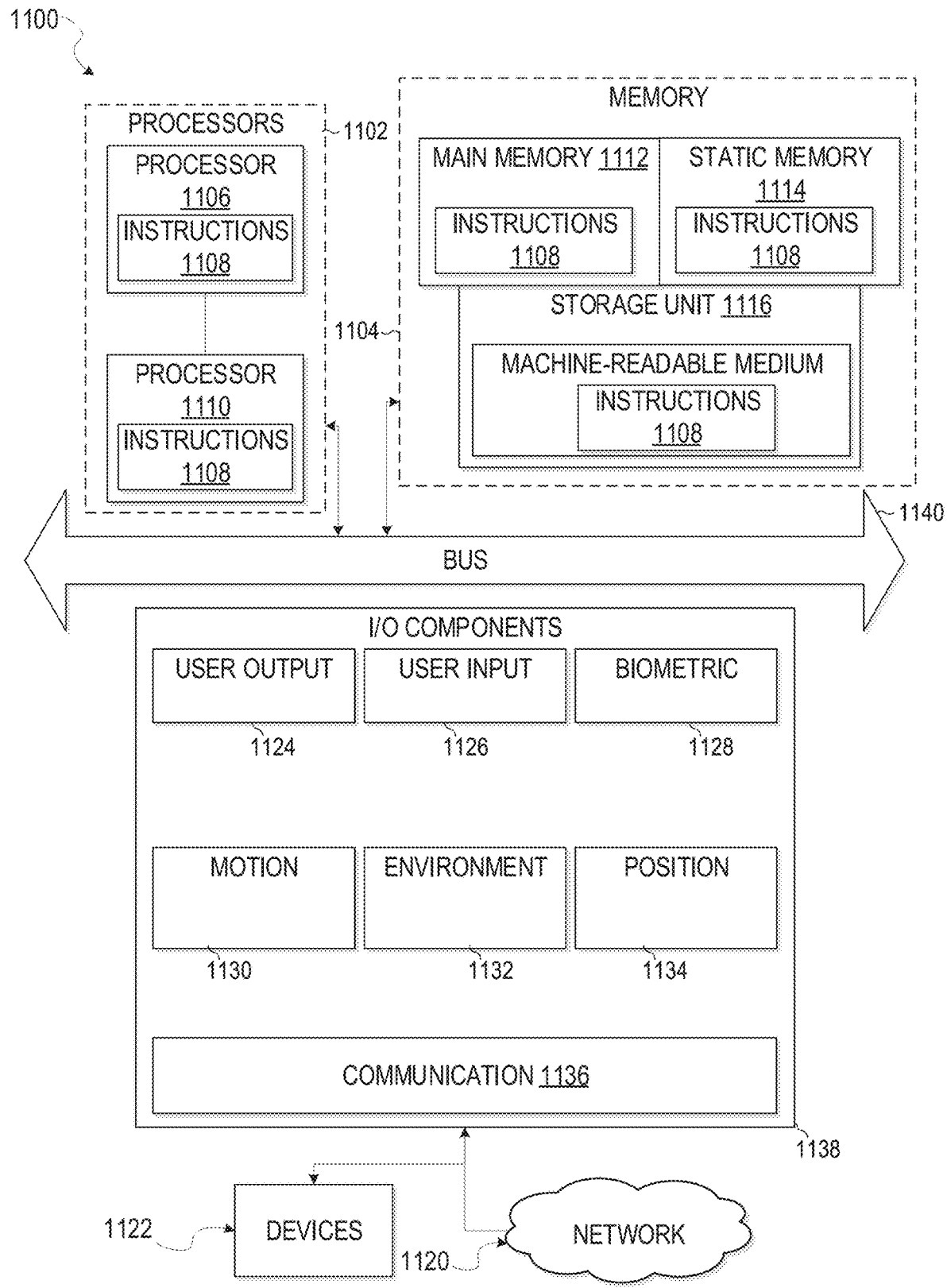
FIG. 11 is a diagrammatic representation of a machine in the form of a computer system within which a set of instructions may be executed for causing the machine to perform any one or more of the methodologies discussed herein, in accordance with some examples.

FIG. 11 is a diagrammatic representation of the machine 1100 within which instructions 1108 (e.g., software, a program, an application, an applet, an app, or other executable code) for causing the machine 1100 to perform any one or more of the methodologies discussed herein may be executed. For example, the instructions 1108 may cause the machine 1100 to execute any one or more of the methods described herein. The instructions 1108 transform the general, non-programmed machine 1100 into a particular machine 1100 programmed to carry out the described and illustrated functions in the manner described. The machine 1100 may operate as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1108, sequentially or otherwise, that specify actions to be taken by the machine 1100. Further, while only a single machine 1100 is illustrated, the term "machine" shall also be taken to include a collection of machines that individually or jointly execute the instructions 1108 to perform any one or more of the methodologies discussed herein. The machine 1100, for example, may comprise the client device 102 or any one of a number of server devices forming part of the messaging server system 108. In some examples, the machine 1100 may also comprise both client and server systems, with certain operations of a particular method or algorithm being performed on the server-side and with certain operations of the particular method or algorithm being performed on the client-side.

The machine 1100 may include processors 1102, memory 1104, and input/output (I/O) components 1138, which may be configured to communicate with each other via a bus 1140. In an example, the processors 1102 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1106 and a processor 1110 that execute the instructions 1108. The term "processor" is intended to include multi-core processors that may comprise two or more independent processors (some-times referred to as "cores") that may execute instructions contemporaneously. Although FIG. 11 shows multiple processors 1102, the machine 1100 may include a single processor with a single-core, a single processor with multiple cores (e.g., a multi-core processor), multiple processors with a single core, multiple processors with multiples cores, or any combination thereof.

The memory 1104 includes a main memory 1112, a static memory 1114, and a storage unit 1116, all accessible to the processors 1102 via the bus 1140. The main memory 1104, the static memory 1114, and the storage unit 1116 store the instructions 1108 embodying any one or more of the methodologies or functions described herein. The instructions 1108 may also reside, completely or partially, within the main memory 1112, within the static memory 1114, within machine-readable medium 1118 within the storage unit 1116, within at least one of the processors 1102 (e.g., within the processor's cache memory), or any suitable combination thereof, during execution thereof by the machine 1100.

The I/O components 1138 may include a wide variety of components to receive input, provide output, produce output, transmit information, exchange information, capture measurements, and so on. The specific I/O components 1138 that are included in a particular machine will depend on the type of machine. For example, portable machines such as mobile phones may include a touch input device or other such input mechanisms, while a headless server machine will likely not include such a touch input device. It will be appreciated that the I/O components 1138 may include many other components that are not shown in FIG. 11. In various examples, the I/O components 1138 may include user output components 1124 and user input components 1126. The user output components 1124 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1126 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1138 may include biometric components 1128, motion components 1130, environmental components 1132, or position components 1134, among a wide array of other components. For example, the biometric components 1128 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1130 include acceleration sensor components (e.g., accelerometer), gravitation sensor components, rotation sensor components (e.g., gyroscope).

The environmental components 1132 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera, and a depth sensor, for example.

The position components 1134 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1138 further include communication components 1136 operable to couple the machine 1100 to a network 1120 or devices 1122 via respective coupling or connections. For example, the communication components 1136 may include a network interface component or another suitable device to interface with the network 1120. In further examples, the communication components 1136 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1122 may be another machine or any of a wide variety of peripheral devices (e.g., a peripheral device coupled via a USB).

Moreover, the communication components 1136 may detect identifiers or include components operable to detect identifiers. For example, the communication components 1136 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1136, such as location via Internet Protocol (IP) geolocation, location via Wi-Fi® signal triangulation, location via detecting an NFC beacon signal that may indicate a particular location, and so forth.

The various memories (e.g., main memory 1112, static memory 1114, and memory of the processors 1102) and storage unit 1116 may store one or more sets of instructions and data structures (e.g., software) embodying or used by any one or more of the methodologies or functions described herein. These instructions (e.g., the instructions 1108), when executed by processors 1102, cause various operations to implement the disclosed examples.

The instructions 1108 may be transmitted or received over the network 1120, using a transmission medium, via a network interface device (e.g., a network interface component included in the communication components 1136) and using any one of several well-known transfer protocols (e.g., hypertext transfer protocol (HTTP)). Similarly, the instructions 1108 may be transmitted or received using a transmission medium via a coupling (e.g., a peer-to-peer coupling) to the devices 1122.

Software Architecture

Figure 12:
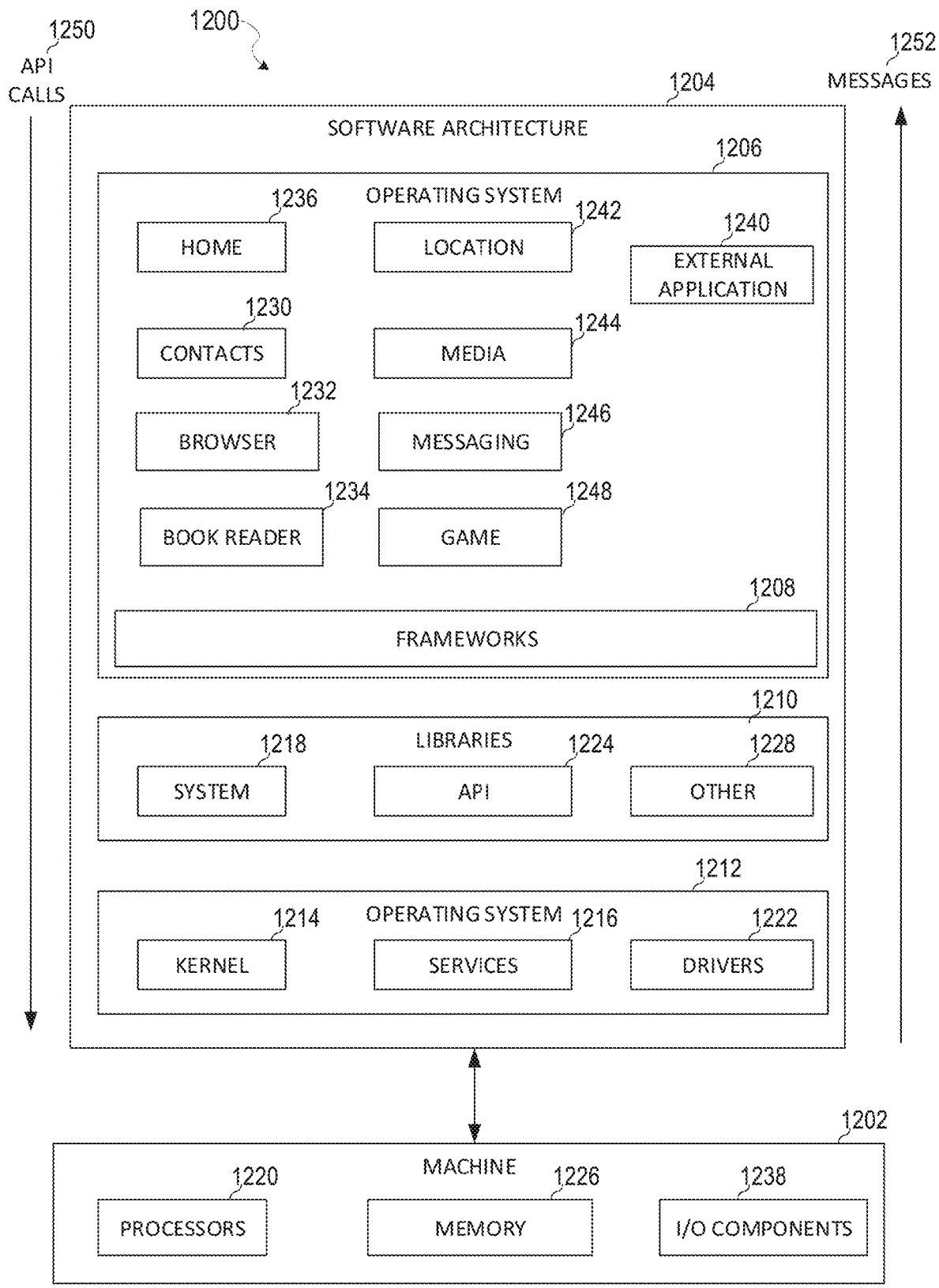
FIG. 12 is a block diagram showing a software architecture within which examples may be implemented.

FIG. 12 is a block diagram 1200 illustrating a software architecture 1204, which can be installed on any one or more of the devices described herein. The software architecture 1204 is supported by hardware such as a machine 1202 that includes processors 1220, memory 1226, and I/O components 1238. In this example, the software architecture 1204 can be conceptualized as a stack of layers, where each layer provides a particular functionality. The software architecture 1204 includes layers such as an operating system 1212, libraries 1210, frameworks 1208, and applications 1206. Operationally, the applications 1206 invoke API calls 1250 through the software stack and receive messages 1252 in response to the API calls 1250.

The operating system 1212 manages hardware resources and provides common services. The operating system 1212 includes, for example, a kernel 1214, services 1216, and drivers 1222. The kernel 1214 acts as an abstraction layer between the hardware and the other software layers. For example, the kernel 1214 provides memory management, processor management (e.g., scheduling), component management, networking, and security settings, among other functionality. The services 1216 can provide other common services for the other software layers. The drivers 1222 are responsible for controlling or interfacing with the underlying hardware. For instance, the drivers 1222 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1210 provide a common low-level infrastructure used by operating system 1206. The libraries 1210 can include system libraries 1218 (e.g., C standard library) that provide functions such as memory allocation functions, string manipulation functions, mathematic functions, and the like. In addition, the libraries 1210 can include API libraries 1224 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1210 can also include a wide variety of other libraries 1228 to provide many other APIs to the applications 1206.

The frameworks 1208 provide a common high-level infrastructure that is used by the applications 1206. For example, the frameworks 1208 provide various graphical user interface (GUI) functions, high-level resource management, and high-level location services. The frameworks 1208 can provide a broad spectrum of other APIs that can be used by the applications 1206, some of which may be specific to a particular operating system or platform.

In an example, the applications 1206 may include a home application 1236, a contacts application 1230, a browser application 1232, a book reader application 1234, a location application 1242, a media application 1244, a messaging application 1246, a game application 1248, and a broad assortment of other applications such as a external application 1240. The applications 1206 are programs that execute functions defined in the programs. Various programming languages can be employed to create one or more of the applications 1206, structured in a variety of manners, such as object-oriented programming languages (e.g., Objective-C, Java, or C++) or procedural programming languages (e.g., C or assembly language). In a specific example, the external application 1240 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the external application 1240 can invoke the API calls 1250 provided by the operating system 1212 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1102 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

What is claimed is:

1. A method comprising:
    receiving, by one or more processors, a monocular image that includes a depiction of a user wearing a garment;
    generating, by the one or more processors, a segmentation of the garment worn by the user in the monocular image;
    accessing a video feed comprising a plurality of monocular images received prior to the monocular image;
    smoothing, using the video feed, the segmentation of the garment worn by the user to provide a smoothed segmentation of the garment worn by the user;
    obtaining a set of skeletal key points associated with the user depicted in the monocular image;
    determining that a first joint represented by the set of skeletal key points is within a threshold distance away from an edge of the smoothed segmentation of the garment worn by the user;
    in response to determining that the first joint is within the threshold distance away from the edge of the smoothed segmentation of the garment worn by the user, determining that the garment worn by the user is a first type of garment; and
    applying one or more visual effects to the monocular image based on the smoothed segmentation of the garment worn by the user and the type of garment that has been determined.

2. The method of claim 1, wherein the garment worn by the user comprises an upper garment comprising clothes that appear in an upper area of a body, and wherein the monocular image includes a depiction of a plurality of users wearing respective garments, the plurality of users including the user, further comprising generating a plurality of segmentations of the respective garments of the plurality of users.

3. The method of claim 1, wherein the monocular image is a first frame of a video, further comprising:
    generating the segmentation using a first machine learning technique, wherein smoothing the segmentation of the garment worn by the user comprises comparing the generated segmentation with a previous segmentation generated by the first machine learning technique from the plurality of monocular images.

4. The method of claim 3, wherein the first machine learning technique comprises a first deep neural network.

5. The method of claim 4, further comprising training the first deep neural network by performing operations comprising:
    receiving training data comprising a plurality of training monocular images and ground truth segmentations for each of the plurality of training monocular images;
    applying the first deep neural network to a first training monocular image of the plurality of training monocular images to estimate a segmentation of a garment worn by a given user depicted in the first training monocular image;
    computing a deviation between the estimated segmentation and the ground truth segmentation associated with the first training monocular image; and
    updating parameters of the first deep neural network based on the computed deviation.

6. The method of claim 5, wherein the training data comprises depictions of upper garments worn by training users, and wherein the plurality of training monocular images comprises ground truth skeletal key points of one or more bodies of the training users depicted in the respective training monocular images, further comprising:
    identifying, based on the ground truth skeletal key points of the given user depicted in the first monocular image, sleeves of the garment worn by the given user; and
    in response to identifying the sleeves, adjusting a weight associated with a parameter of a loss function used to update parameters of the first deep neural network.

7. The method of claim 5, wherein the plurality of training monocular images comprises a plurality of image resolutions, further comprising generating a plurality of segmentation models based on the first deep neural network, a first of the plurality of segmentation models being trained based on training monocular images having a first of the plurality of image resolutions, a second of the plurality of segmentation models being trained based on training monocular images having a second of the plurality of image resolutions.

8. The method of claim 1, further comprising adjusting a loss function or weights used to update parameters of a machine learning model based on determining that the garment worn by the user is the first type of garment, the machine learning model trained to generate the segmentation of the garment.

9. The method of claim 1, wherein the first joint comprises an elbow joint, and wherein the first type of garment comprises a short sleeve shirt.

10. The method of claim 1, wherein smoothing the segmentation comprises applying the video feed to a second machine learning technique to predict one or more segmentations of the garment based on depictions of garments respectively in the plurality of monocular images.

11. The method of claim 10, wherein the second machine learning technique comprises a second deep neural network, and wherein smoothing the segmentation comprises comparing the predicted one or more segmentations of the garment provided by the second deep neural network with the segmentation of the garment, in the received monocular image, generated by a first machine learning technique.

12. The method of claim 11, further comprising training the second deep neural network by performing operations comprising:
    receiving training data comprising a plurality of training videos and ground truth segmentations for garments depicted in each of the plurality of training videos;
    applying the second deep neural network to a first training video of the plurality of training videos to predict a segmentation of the garment in a frame subsequent to the first training video;
    computing a deviation between the predicted segmentation of the garment in the frame subsequent to the first training video and the ground truth segmentation of the garment depicted in the frame subsequent to the first training video;
    updating parameters of the second deep neural network based on the computed deviation; and
    repeating the applying, computing and updating steps for each of the plurality of training videos.

13. The method of claim 1, wherein the plurality of monocular images was received a threshold number of seconds prior to receiving the monocular image.

14. The method of claim 1, further comprising:
    determining one or more device capabilities of a client device used to capture the monocular image; and
    selecting a segmentation model to generate the segmentation based on the one or more device capabilities.

15. The method of claim 1, wherein applying the one or more visual effects comprises:
    replacing the garment worn by the user with a virtual garment; and
    recoloring the garment worn by the user by replacing pixels of the garment that fall within the smoothed segmentation with target pixel values.

16. The method of claim 15, wherein the target pixel values correspond to pixels of an animation or target image representing a texture or color.

17. The method of claim 1, wherein applying the one or more visual effects comprises:
    determining a whole body pose of the user depicted in the image based on data representing three-dimensional whole-body position information of the user;
    determining that the segmentation of the garment worn by the user corresponds to an upper body garment;
    accessing a virtual lower body garment in response to determining that the segmentation of the garment worn by the user corresponds to the upper body garment;
    adjusting a pose of the virtual lower body garment based on the whole body pose of the user;
    receiving a whole-body segmentation of the user depicted in the image;
    blending pixels of the virtual lower body garment with pixels of a background of the image based on the whole-body segmentation of the user depicted in the image; and
    selecting an occlusion pattern between the garment worn by the user and the virtual lower body garment.

18. The method of claim 17, further comprising:
    determining that a portion of the segmentation of the garment worn by the user overlaps a first portion of the pixels of the virtual lower body garment; and
    in response to determining that the portion of the segmentation of the garment worn by the user overlaps the portion of the pixels of the virtual lower body garment, replacing the first portion of the pixels of the virtual lower body garment with a second portion of pixels of the garment worn by the user that correspond to the portion of the segmentation.

19. A system comprising:
at least one processor; and
a memory component having instructions stored thereon, when executed by the at least one processor, causes the at least one processor to perform operations comprising:
    receiving a monocular image that includes a depiction of a user wearing a garment;
    generating a segmentation of the garment worn by the user in the monocular image;
    accessing a video feed comprising a plurality of monocular images received prior to the monocular image;
    smoothing, using the video feed, the segmentation of the garment worn by the user to provide a smoothed segmentation of the garment worn by the user; and
    obtaining a set of skeletal key points associated with the user depicted in the monocular image;
    determining that a first joint represented by the set of skeletal key points is within a threshold distance away from an edge of the smoothed segmentation of the garment worn by the user;
    in response to determining that the first joint is within the threshold distance away from the edge of the smoothed segmentation of the garment worn by the user, determining that the garment worn by the user is a first type of garment; and
    applying one or more visual effects to the monocular image based on the smoothed segmentation of the garment worn by the user and the type of garment that has been determined.

20. A non-transitory computer-readable storage medium having stored thereon instructions that, when executed by at least one processor, cause the at least one processor to perform operations comprising:
    receiving a monocular image that includes a depiction of a user wearing a garment;
    generating a segmentation of the garment worn by the user in the monocular image;

accessing a video feed comprising a plurality of monocular images received prior to the monocular image;

smoothing, using the video feed, the segmentation of the garment worn by the user to provide a smoothed segmentation of the garment worn by the user;

obtaining a set of skeletal key points associated with the user depicted in the monocular image;

determining that a first joint represented by the set of skeletal key points is within a threshold distance away from an edge of the smoothed segmentation of the garment worn by the user;

in response to determining that the first joint is within the threshold distance away from the edge of the smoothed segmentation of the garment worn by the user, determining that the garment worn by the user is a first type of garment; and applying one or more visual effects to the monocular image based on the smoothed segmentation of the garment worn by the user and the type of garment that has been determined.

* * * * *